(12) United States Patent
Shimano et al.

(10) Patent No.: US 6,400,664 B1
(45) Date of Patent: Jun. 4, 2002

(54) OPTICAL HEAD INCLUDING ELECTRICAL CIRCUIT WHICH PRODUCES FOCUS ERROR SIGNAL AND TRACKING ERROR SIGNAL UNAFFECTED BY VARIATIONS IN INTENSITY DISTRIBUTIONS OF REFLECTED LIGHT BEAMS

(75) Inventors: Takeshi Shimano, Tokorozawa; Shigeru Nakamura, Tachikawa; Kunikazu Ohnishi, Yokosuka; Masayuki Inoue, Yokohama; Yukio Fukui, Machida, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/249,290

(22) Filed: Feb. 12, 1999

(30) Foreign Application Priority Data

Feb. 16, 1999 (JP) .......................... 10-032559

(51) Int. Cl.$^7$ .............................. G11B 7/00
(52) U.S. Cl. ................. 369/44.37; 369/44.41; 369/44.25
(58) Field of Search .......................... 369/44.25, 44.26, 369/44.29, 44.35–44.37, 44.41

(56) References Cited

U.S. PATENT DOCUMENTS

| | | | |
|---|---|---|---|
| 4,742,218 A | * 5/1988 | Nakamura et al. ... | 369/44.42 X |
| 4,750,162 A | 6/1988 | Tajima | |
| 4,970,710 A | 11/1990 | Lee | |
| 5,084,849 A | * 1/1992 | Ishii et al. ............... | 369/44.35 |
| 5,408,452 A | 4/1995 | Sakemoto et al. | |
| 5,440,536 A | 8/1995 | Ito et al. | |
| 5,502,708 A | * 3/1996 | Morimoto ................ | 369/44.41 |
| 5,610,883 A | * 3/1997 | Yanagawa ................ | 369/44.41 |
| 5,629,911 A | * 5/1997 | Sasaki .................... | 369/44.42 |
| 5,719,839 A | * 2/1998 | Naito ...................... | 369/53.36 |
| 5,815,473 A | * 9/1998 | Takahashi et al. ....... | 369/44.41 |
| 5,859,819 A | * 1/1999 | Miyabe et al. ........... | 369/44.41 |
| 5,886,964 A | * 3/1999 | Fujita ..................... | 369/44.41 |
| 5,930,220 A | * 7/1999 | Shimano et al. .......... | 369/110 |
| 6,104,689 A | * 8/2000 | Noguchi .................. | 369/112 |
| 6,125,087 A | * 9/2000 | Ohnishi et al. ........... | 369/44.41 |

FOREIGN PATENT DOCUMENTS

| | | |
|---|---|---|
| EP | 0 762 396 A1 | 3/1997 |
| JP | 4-168631 | 6/1992 |

OTHER PUBLICATIONS

Diffraction Theory of Laser Read–Out Systems for Optical Video Discs, H.H. Hopkins, Dept. of Physics, J. Opt. Soc. Am., vol. 69, No. 1, 1/79, pp. 424.

* cited by examiner

*Primary Examiner*—Aristotelis M. Psitos
(74) *Attorney, Agent, or Firm*—Antonelli, Terry, Stout & Kraus, LLP

(57) ABSTRACT

An optical head eliminates an disturbance which occurs in a focus error signal in association with the decentering of an optical disk when an optical spot crosses a track on a storage film surface, and in addition the optical head cancels an off-set which occurs in a tracking error signal in association with the movement of an objective lens. In the constitution of the optical head, phases of wave surfaces of ±1st order diffracted lights are shifted by an amount of $\lambda/2$ with a common period by using a phase-inverted diffraction grating the phase of which is inverted with a period of $D\lambda/(2P \cdot NA)$ in a radial direction of the optical disk, thus causing, on the optical disk, sub-spots to be located on the same track as a main-spot. Taking advantage of this location, focal point shift error signals of the main-spot and the sub-spots are added to each other with an appropriate gain ratio, thereby making it possible to cancel the disturbance which occurs in the focus error signal. Meanwhile, tracking error signals of the main-spot and the sub-spots according to a push-pull method are subtracted from each other with an appropriate gain ratio, thereby making it possible to cancel the off-set.

6 Claims, 12 Drawing Sheets

CHANGES OF PHASE DIFFERENCE OF
INTERFERENCE BY PHASE FILTER

| INTERFERRING DIFFRACTION ORDER | | REGION | | | | | | |
|---|---|---|---|---|---|---|---|---|
| | | a | b | c | d | e | f | g |
| 0 | -2 | - | - | - | - | - | - | 0 |
| | -1 | π | - | - | - | π | π | π |
| | 1 | π | π | π | π | - | - | - |
| | 2 | - | - | - | 0 | - | - | - |
| -1 | -2 | - | - | - | - | - | - | π |
| | 1 | 0 | - | - | - | - | - | - |
| 1 | 2 | - | - | - | π | - | - | - |

NA:0.6, WAVELENGTH:0.66 μm, TRACK PITCH:1.48 μm
DISK:LAND AND GROOVE, ASTIGMATISM:0.2λ (-45°),
SPHERICAL ABERRATION:-0.47λ,
DETECTOR DEVIATION:5 μm(DISK RADIAL DIRECTION)
FOCAL LENGTH OF DETECTION LENS:22.5mm,
ASTIGMATIC DISTANCE IN DETECTION OPTICS:0.9mm

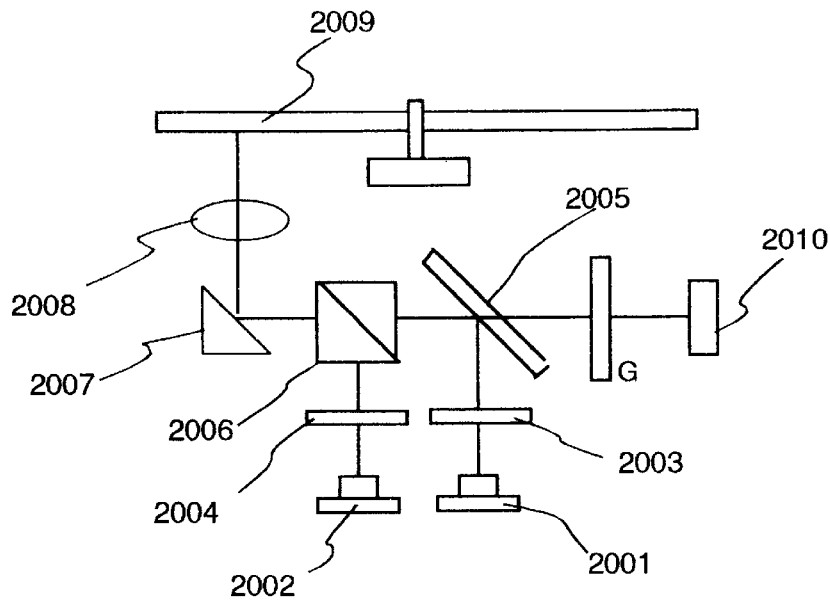

Fig. 20

| AF signal | G (in Fig.20) | Detector pattern | Operation method |
|---|---|---|---|
| Beam size detection | 2101 | a b c d e f g h i j k l m  Front focus  Back focus | AF=a+b-c-d<br>PP=f+g-h-i- α (l+m)<br>DPD=f+i-h-g<br>RF=e+f+g+h+i<br>3S-TR=c+d-l-m<br>(α:constant) |
| Double knife edge | 2102 | a b c d e f g h i j | AF=g-h-i+j<br>PP= α (a-b)-(c+d-e-f)<br>DPD=c-d-e+f<br>RF=c+d+e+f<br>3S-TR=a+b-g-h-i-j<br>(α:constant) |
| Astigmatism | No | a b c d e f g h i j k l | AF=e+h-f-g+a+d-b-c<br>PP= α (a+b-c-d)-(e+f-g-h)<br>DPD=e+h-f-g<br>RF=e+f+g+h<br>3S-TR=a+b+c+d-i-j-k-l<br>(α:constant) |

Fig. 21

OPTICAL HEAD INCLUDING ELECTRICAL CIRCUIT WHICH PRODUCES FOCUS ERROR SIGNAL AND TRACKING ERROR SIGNAL UNAFFECTED BY VARIATIONS IN INTENSITY DISTRIBUTIONS OF REFLECTED LIGHT BEAMS

BACKGROUND OF THE INVENTION

The present invention belongs to an optical head used in an optical disk device, and more particularly relates to a technique for enhancing a performance in detection of a position controlling signal for an optical spot thereof.

Conventional techniques on methods for controlling a focal point position in an optical disk device are described in, for example, "Fundamentals and Applications of Optical Disk Storage", Y. Tsunoda, 1995, 1st edition (Korona Corp., Tokyo), pp. 79–83. According to this literature, there are the following methods: Foucault method (Knife edge method), an astigmatic method, a beam size detection method, an image rotating method, and so on. From criteria such as simplicity of an optical system required, the ease with which the adjustment can be made, and the ease with which combination with a tracking detection can be achieved, the most prevailing method, at the present stage, is the astigmatic method. In the astigmatic method, however, there existed a problem that, when an optical spot crosses a track on the surface of a storage film, a disturbance is apt to occur in a focus error signal in association with a decentering of an optical disk. This disturbance is likely to occur especially when astigmatism takes place in a focused spot or the optical spot is shifted on an optical detector. Examples of methods for reducing the disturbance are disclosed as follows: A method of reducing the disturbance by blocking light out of a central portion of a detected light beam is disclosed in JP-A-6-162527 and JP-A-6-309687, a method of reducing it by adjusting rotation of an objective lens is disclosed in JP-B-5-68774, and a method of reducing it by means of an operation between a light with astigmatism and a light without astigmatism in a detected system is disclosed in JP-A-5-197980. None of them, however, is a fundamental method for solving the above-described problem. Thus, at the present stage, the reducing effect obtained is not necessarily enough.

In particular, in a land-groove type optical disk employed in a DVD-RAM planned to be brought into a commercial stage soon, the disturbance occurs quite outstandingly. The reason is as follows: In the land-groove type optical disk, a width of a guiding groove (groove) is substantially equal to a width of a portion of a guiding inter-groove (land), and information is stored on the both sides thereof. On account of this, a pitch of the guiding groove itself, when compared with an optical spot, is formed to be larger than in conventional optical disks. This extraordinarily intensifies a tracking error signal according to a push-pull method described later, thus causing the disturbance to occur quite outstandingly. This condition, accordingly, brings about a situation that, in an optical head for the DVD-RAM, it can not be helped employing the Foucault method or the beam size detection method the configuration or the adjustment of which is complicated.

Conventional techniques on methods for controlling a tracking in an optical disk device are similarly described in, for example, the above-cited "Fundamentals and Applications of Optical Disk Storage", Y. Tsunoda, 1995, 1st edition (Korona Corp., Tokyo), pp. 83–92. According to this literature, there are methods such as a three-spots method and a diffracted light differential method (push-pull method). Judging from criteria such as simplicity of an optical system required, the ease with which the adjustment can be made, and a resistance to the disturbance, the three-spots method is mainly employed in a read only type optical disk such as a compact disk (CD). Meanwhile, the push-pull method is mainly employed in the case of a magneto-optical disk or the DVD-RAM which needs a high laser emission power at the time of the recording. At this time, there can be considered another way in which, exchanging the roles with each other, the push-pull method is employed toward the CD and the three-spots method is employed toward writable optical disks. However, there exist circumstances which make such an employment impossible.

In performing a CD pick up, in order to cause a focused spot to follow a decentering of the optical disk for the necessity of low price, the objective lens is moved by only being mounted on a lens actuator. Then, if the push-pull method is employed, it turns out that a detected light beam moves on the optical detector. This phenomenon appears as an off-set. Also, at a pit depth of $\lambda/(4n)$ ($\lambda$: light wavelength, n: substrate refractive index) at which a signal amplitude becomes largest in the reproduction-only type optical disk, there are the following problems: of diffracted light by means of a periodic structure of train of pits in the radial direction, 0th order light becomes smaller. In addition to this, even when the focused spot is off-track, no unbalance occurs in interference intensity between the 0th order light and $\pm$1st order diffracted lights. This makes it impossible to obtain the tracking error signal.

Meanwhile, in the storage-able optical disks, especially in the magneto-optical disk, compensation for the decentering of the optical disk is usually performed by an actuator called a coarse actuator. The coarse actuator mounts the optical head or only a portion of the objective lens and an objective lens actuator so as to allow the optical spot to come near to a proximity of a track to be objected. Namely, the magneto-optical disk is constituted in such a manner that, of a tracking error, the low frequency components are compensated by the coarse actuator and the high frequency components are compensated by the objective lens actuator, thereby enhancing a reliability needed for the storage operation. Accordingly, an amount of movement by the objective lens actuator is lower than in the read only type optical disk such as the CD. This makes it possible to employ the push-pull method which has higher light utilization efficiency than the three-spots method does.

Also, if the three-spots method is employed toward the storage-able optical disks, as described on page 127 of "Technical Digest of Symposium on Optical Memory '86", there take place the following problems: First, in an optical disk such as the DVD-RAM, i.e. the type of optical disk that performs the storage by means of a variation in reflectance of a storage mark, at the time of the storage operation, there arises a difference in the amount of light between a preceding sub-spot and a subsequent sub-spot. This causes an off-set to occur in the tracking error signal. Also, in the case of the magneto-optical disk, there exists a feedback light back to a semiconductor laser. On account of this, a tilt of the disk unbalances a condition of stray-lights interference on the both sides of sub-spots. This also causes an off-set to occur. Moreover, as described already, the land-groove type optical disk is employed in the DVD-RAM. This circumstance can also be mentioned as a reason for making it impossible to employ the three-spots method toward the DVD-RAM. Namely, in the land-groove type optical disk, a width of the land portion is originally made equal to that of the groove portion in order to make an amount of reflected light of the land portion equal to that of the groove portion. This necessarily results in a fact that, even when an optical spot is off-track, the amount of light scarcely varies, thus making it impossible to obtain a tracking error signal according to the three-spots method. Accordingly, it can not be helped employing the push-pull method in the DVD-RAM. However, unlike the case of the magneto-optical disk, it is required to lower the price of the DVD-RAM down to a price close to the price of the CD. Consequently, it becomes absolutely necessary to reduce the off-set in a tracking error signal which accompanies the movement of the objective lens according to the push-pull method.

A conventional technique for solving the above-mentioned problem in the DVD-RAM is described in, for example, "National Technical Report", Vol. 40, No. 6, (1994), pp. 771–778. Here, the optical disk device is constituted as follows: The objective lens, a λ/4 plate, and a polarizing diffraction grating are integrally mounted on an objective lens actuator. Moreover, the polarizing diffraction grating is constituted so that interference regions, in which, of diffracted light by mean of the disk, +1st order diffracted light and −1st order diffracted light each interfere with 0th order light, are diffracted with a different diffraction angle, respectively. This constitution makes it possible to separate, on the optical detector, the interference region between the +1st order diffracted light and the 0th order light from the interference region between the −1st order diffracted light and the 0th order light. From this, the above-mentioned literature shows the following: If a dual-divided optical detector is constituted so that, when the objective lens is moved, the lights do not stray out of the optical detector, it becomes possible to eliminate the off-set caused by the phenomenon that the optical spots move on the optical detector.

Also, employing the polarizing diffraction grating as a diffraction grating makes the following possible: When a light heading for the disk passes through the polarizing diffraction grating, the diffraction efficiency is made substantially equal to zero, and when a reflected light from the disk passes through the polarizing diffraction grating again, the diffraction efficiency is caused to become an appropriate value. Meanwhile, in the case of a non-polarizing ordinary diffraction grating, it diffracts the light heading for the disk, too, thus making it impossible to avoid a loss of the amount of light. Employing the polarizing diffraction grating in this way allows only the necessary diffraction of the reflected light to occur, thus making it possible to prevent the loss of the amount of light.

However, in this conventional example, the objective lens, the λ/4 plate, and the polarizing diffraction grating are integrally mounted on the objective lens actuator. This constitution results in a problem that a movable portion of the actuator becomes heavy, thus restricting a response speed of the actuator down to a low level. Since optical disks are being improved in the storage density and at the same time are becoming faster in the transfer rate year by year, the above-described conventional example is not able to meet the trend of even further speeding-up in the near future.

Another method, which, with no other optical component except the objective lens mounted on the objective lens actuator, makes it possible to eliminate the tracking error signal off-set which accompanies the movement of the objective lens according to the push-pull method, is disclosed in the above-described "Technical Digest of Symposium on Optical Memory '86", pp. 127–132. This method is referred to as a differential push-pull method. In the method, the three-spots method is employed, and respective tracking error signals according to the push-pull method are subtracted on a main-spot and two sub-spots, thereby eliminating the tracking error signal off-set which accompanies the movement of the objective lens. Namely, in the method, the sub-spots are located in such a manner that they are shifted on the both sides of the main spot by one-half of a period of the guiding groove, thereby simultaneously detecting a light beam in which variations in interference intensity distribution of a reflected light beam reflected from the disk in association with an off-track are inverted, and thus generating opposite phase tracking error signals which contain the off-set in the same phase. Then, these opposite phase tracking error signals are subtracted, thereby allowing only the off-set to be cancelled. According to this conventional example, the ratio of the gain to amplify the signal by the main spot to the gain of the signal by the sub-spot is chosen so as to compensate the intensity unbalance caused by diffraction efficiency characteristics of the diffraction grating to generate sub-spots. The use of this conventional example, with no other optical component except the objective lens mounted on the objective lens actuator, basically makes it possible to eliminate the tracking error signal off-set which accompanies the movement of the objective lens according to the push-pull method. In the present conventional example, however, no countermeasure is taken against the mixture of the disturbance into the focus error signal when a focused spot crosses the guiding groove in the astigmatic focus error detecting method described earlier. Also, as described in the present conventional example, when one of the sub-spots lies in a post-stored track and the other lies in a pre-stored track, the effect of reducing the off-set is not enough. Further, although not described in the present conventional example, when a total amount of reflected light on the guiding grooves differs from a total amount of reflected light on the guiding inter-grooves, the off-set also remains in the present conventional example. This situation arises when a width-of the guiding groove is not equal to that of the guiding inter-groove. However, in the case of the DVD-RAM employing the land-groove type optical disk in which the width of the guiding groove is equal to that of the guiding inter-groove, such a situation also arises if the main-spot lies in the post-stored track and the two sub-spots lies in the pre-stored track or in the case opposite thereto. Still further, in the present conventional example, there exist the plurality of optical spots. This brings about a disadvantage in the light utilization efficiency at the time of the storage.

Moreover, the gains to amplify the signals by main spot and sub-spots chosen in this conventional method is insufficient to cancel the effect completely. The reason is as follows. As described later, when a width of the guiding groove does not substantially equal to half of the pitch of guiding grooves, the reflectance of the light when the focused spot is at the guiding groove is different from that when the focused spot is at the inter-groove. It is also necessary to compensate this unbalance of reflectance for perfect offset cancellation. For the higher the density of the optical disk, the allowance of the offset is the severer. Therefore this insufficient cancellation must be a problem, recently.

Still more, in this conventional example, the optical disk was not a land-groove type optical disk. Therefore, there is no cross-talk from stored information signal, because the sub-spots on the optical disk are not on the information track at readout process. In the case of land-groove type optical disk such as DVD-RAM, however, the sub-spots is also on the information track of reading out from the disk. This results in disturbance to the tracking error signal.

Another method, which cancels the disturbance in the focus error signal of astigmatic method, is disclosed in the JP-A-4-168631. Also in this method, the main spot and sub-spots by a diffraction grating is positioned onto the optical disk at the distances of the half of the pitch of guiding grooves in the radial direction of the disk. The reflected beams from these focused spots pass through a cylindrical lens, then detected by three quadratic photo-detectors, respectively. From the output signal of these photo detectors, three focus error signals are obtained by calculation in the electric circuit. These focus error signals are amplified with gains which are proportional to the reciprocals of the light intensity of each focused spot on the optical disk, which are not proportional to the reciprocal of the reflected light intensity. Then summation of these amplified focus error signals is calculated in the electric circuit. Employing this method, the extra disturbance to the conventional focus error signal by aberrations or miss-alignment of the optical components or photo detector can be eliminated. The optimum gains for disturbance cancellation for this method is different from those for differential push-pull method as mentioned. However, in this method, no tracking method is disclosed. Further more, if the differential push-pull method described in the conventional literature itself is employed with this focusing error detection method, it is necessary to set the gains to amplify the signal by each reflected light beam equal between in the focus error signal and in the tracking error signal, namely proportional to the reciprocals of the light intensity of incident focused spots on to the optical disk. It results in the insufficient cancellation of the offset of tracking error signal as mentioned.

SUMMARY OF THE INVENTION

In view of the above-described conventional techniques, in the method and the device for detecting the focal point shift, a problem to be solved by the present invention is to fundamentally eliminate the disturbance which occurs in the focus error signal in association with the decentering of an optical disk when an optical spot crosses a track on the surface of the storage film.

Also, another problem to be solved by the present invention is to fundamentally cancel the off-set which occurs simultaneously in the tracking error signal in association with the movement of the lens.

Also, when employing a method such as the differential push-pull method in which a light beam, in which variations in interference intensity distribution of a reflected light beam at the time when an optical spot on the disk crosses the guiding groove are inverted, is generated simultaneously with the ordinary light beam and thus the opposite phase tracking error signals which contain off-set components with the same phase are generated so as to cause the same phase off-set to be cancelled, another problem to be solved by the present invention is to cancel an off-set which occurs from a difference in the total amount of reflected light between these light beams.

Also, another problem to be solved by the present invention is not only to cancel, in the differential push-pull method, the off-set which occurs in the tracking error signal in association with the movement of the lens but also to fundamentally eliminate, in the focal point shift detecting method, the disturbance which occurs in the focus error signal in association with the decentering of an optical disk when an optical spot crosses a track on the surface of the storage film.

Also, another problem to be solved by the present invention is to obtain, with the sub-spots in the differential push-pull method located on the same track as the main-spot, the same effect of canceling the tracking error signal off-set which accompanies the movement of the objective lens.

Also, another problem to be solved by the present invention is to constitute the optical disk device so that a single spot on the disk exhibits the same effect as the differential push-pull method-does.

Also, another problem to be solved by the present invention is to obtain these effects toward the astigmatic focal point shift detecting method and the push-pull tracking detecting method in particular.

Also, another problem to be solved by the present invention is to illustrate a configuration of an optical detector which allows these effects to be obtained.

Also, another problem to be solved by the present invention is to enhance performance in the canceling of the tracking error signal off-set due to the movement of the objective lens when combining the differential push-pull method with the additive astigmatic method.

Also, another problem to be solved by the present invention is to eliminate an influence of the disturbance due to the information pits when combining the differential push-pull method with the additive astigmatic method so as to apply them together to the land-groove type optical disk.

In order to solve the above-described problems, an optical head comprises at least a semiconductor laser, a light-converging optical system for converging an emitted light from the semiconductor laser onto an optical disk having a periodic structure in a radial direction as at least one focused spot, an optical detection system for detecting a reflected light from the optical disk, and an electrical circuit for calculating an amount of received light through a photoelectric-conversion thereof so as to obtain at least one of a focus error signal of the focused spot converged on the optical disk, a tracking error signal of the focused spot converged on the optical disk, and a data signal stored in the optical disk. The light-converging optical system includes means for generating a plurality of reflected light beams in which polarities of their intensity distribution variations at the time when the periodic structure crosses the focused spot on the optical disk are substantially inverted with each other, the optical detection system includes means for splitting and simultaneously detecting the plurality of reflected lights, and the electrical circuit obtains the focus error signal by taking summation of focus error signals of the respective reflected light beams so that variations of the focus error signal caused by their intensity distribution variations cancel out with each other.

Also, at this time, a difference between respective tracking error signals of the plurality of reflected lights the polarities of which are inverted with each other is simultaneously defined as the tracking error signal.

Moreover, at this time, in defining, as the tracking error signal, the difference between the respective tracking error signals of the plurality of reflected light beams the polarities of which are inverted with each other, in the electrical circuit, the respective tracking error signals are amplified with a gain which is proportional to a ratio between reciprocals of respective total amounts of the reflected lights when one of said focused spot is at the information track of said optical disk, and after that a difference between the respective tracking error signals thus amplified is calculated, then being defined as the tracking error signal.

Also, in these constitutions, there is provided a beam splitting device for splitting the reflected light beam from the optical disk off from an optical path extending from the semiconductor laser, and the means for generating said plurality of reflected light beams the polarities of intensity distribution variations of which are substantially inverted with each other is a diffraction grating located between the semiconductor laser and the beam splitting device. Moreover, the diffraction grating is installed in such a manner as to be tilted toward the radial direction of the optical disk so that focused spots of ±1st order diffracted lights by means of the diffraction grating are located in such a manner that, on the optical disk and with reference to a focused spot of a 0th order light, they are shifted by about one-half of a period of the above-described periodic structure in opposite directions to each other in the radial direction.

Also, there is provided a beam splitting device for splitting the reflected light beam from the optical disk off from an optical path extending from the semiconductor laser, and the means for generating the plurality of reflected light beams the polarities of intensity distribution variations of which are substantially inverted with each other is a diffraction grating located between the semiconductor laser and the beam splitting device. Moreover, the diffraction grating has gratings the phase of which is inverted at an interval of substantially $\lambda D/(2NA \cdot P)$ ($\lambda$: light wavelength, NA: numerical aperture of an objective lens, P: period of the periodic structure in the radial direction on the optical disk, D: effective light beam diameter on the diffraction grating) in regions of a common width in the radial direction on the optical disk. The diffraction grating is installed in such a manner that a direction of the gratings thereof is in parallel to a tangential direction of the optical disk so that, on the optical disk, focused spots of ±1st order diffracted lights by means of the diffraction grating are located on the same track as a focused spot of a 0th order light. Furthermore, the optical detection system splits and detects these focused spots. Then, a data signal is obtained from an amount of received light signal resulting from the 0th order light.

Still further, there is provided a beam splitting device for splitting the reflected light beam from the optical disk off from an optical path extending from the semiconductor laser, and the means for generating the plurality of reflected light beams the polarities of intensity distribution variations of which are substantially inverted with each other is a polarizing phase shifter located between the semiconductor laser and the beam splitting device. The polarizing phase shifter is constituted so that it relatively inverts a phase of a linearly polarized light component, which is polarized in a specific direction, at an interval of substantially $\lambda D/(2NA \cdot P)$ ($\lambda$: light wavelength, NA: numerical aperture of an objective lens, P: period of the periodic structure on the optical disk, D: effective light beam diameter on a diffraction grating) in regions of a common width in the radial direction on the optical disk, and a phase of a linearly polarized light component perpendicular to the linearly polarized light component is not varied over a whole system of the polarizing phase shifter. Furthermore, the optical detection system splits and detects these polarized light components with the use of a polarizing beam splitting device. Then, a data signal is obtained from the polarized light component to which no phase inversion is added.

In particular, the above-described constitutions are embodied by employing the astigmatic method for the focus error detection and by employing the push-pull method for the tracking error detection.

Also, in the optical detection system, there is provided an optical detector in which there exist at least two sets of optical detection regions each of which receives a single optical spot with a four-divided optical detection region.

Also, an optical head includes a semiconductor laser, a light-focusing optical system for focusing, as at least one focused spot, an emitted light from the semiconductor laser onto an optical disk which has a periodic structure such as guiding grooves in its radial direction, an optical detection system for detecting a reflected light from the optical disk, and an electrical circuit for obtaining, from the reflected light, both a focus error signal of one of the focused spots and a tracking error signal thereof. In the optical head, sub-spots, for example, are located by an apparatus such as a diffraction grating in such a manner that they are shifted from a main-spot by one-half of a period of the guiding grooves, thereby generating two kinds of and, for each of the kinds, at least one or more of reflected light beams in which polarities of their intensity distribution variations at the time when the periodic structure crosses the focused spots are substantially inverted with each other. The optical detection system splits and detects the plurality of reflected light beams. In the electrical circuit, focus error signals, which are obtained by each adding focus error signals generated from the two kinds of and, for each of the kinds, at least one of reflected light beams, are amplified and added further, thereby obtaining the focus error signal. Moreover, tracking error signals, which are obtained by each adding tracking error signals generated from the two kinds of and, for each of the kinds, at least one of reflected light beams, are amplified and subtracted from each other, thereby obtaining the tracking error signal. At this time, an optical disk such as the land-groove type optical disk is used in which the guiding grooves constitute the periodic structure and, as compared with an occasion when one of the focused spots is situated at a guiding groove, an error of the reflectance on an occasion when it is situated at a guiding inter-groove falls within a range of ±10% thereof. The use of such type of optical disk makes it possible to cause an amplification gain ratio between the tracking error signals of the two kinds of reflected light beams to coincide with an amplification gain ratio between the focus error signals of the two kinds of reflected light beams.

Also, in a similar optical head, in a case where the optical disk used is an optical disk other than the land-groove type optical disk, i.e., in a case where the reflectances differ between an occasion when one of the focused spots is positioned on an information track of the optical disk and an occasion when it is positioned at a position which is apart from the information track by one-half of the period of the periodic structure, it turns out that the amplification gain ratio between the tracking error signals of the plurality of reflected light beams differs from the amplification gain ratio between the focus error signals of the plurality of reflected light beams.

Also, in the optical head, the electrical circuit for detecting the sub-spots is provided with a frequency characteristic which makes it possible to cut off a frequency bandwidth of a read-out signal of recorded information written in the optical disk.

Other objects, features and advantages of the present invention will become apparent from the following detailed description of the embodiments of the invention taken in conjunction with the accompanying drawings.

BRIEF DESCRIPTION OF THE DRAWINGS

FIG. 20 is a diagram for showing an embodiment of an optical system constitution according to the present invention in which the reproduction is possible in a DVD, a DVD-RAM, a CD, and a CD-R;

FIG. 21 is a diagram for explaining details of a constitution for the detection in the embodiment in FIG. 20;

DETAILED DESCRIPTION OF THE PREFERRED EMBODIMENTS

The description will be given below concerning embodiments of the present invention, using the accompanying drawings.

Figure 1:
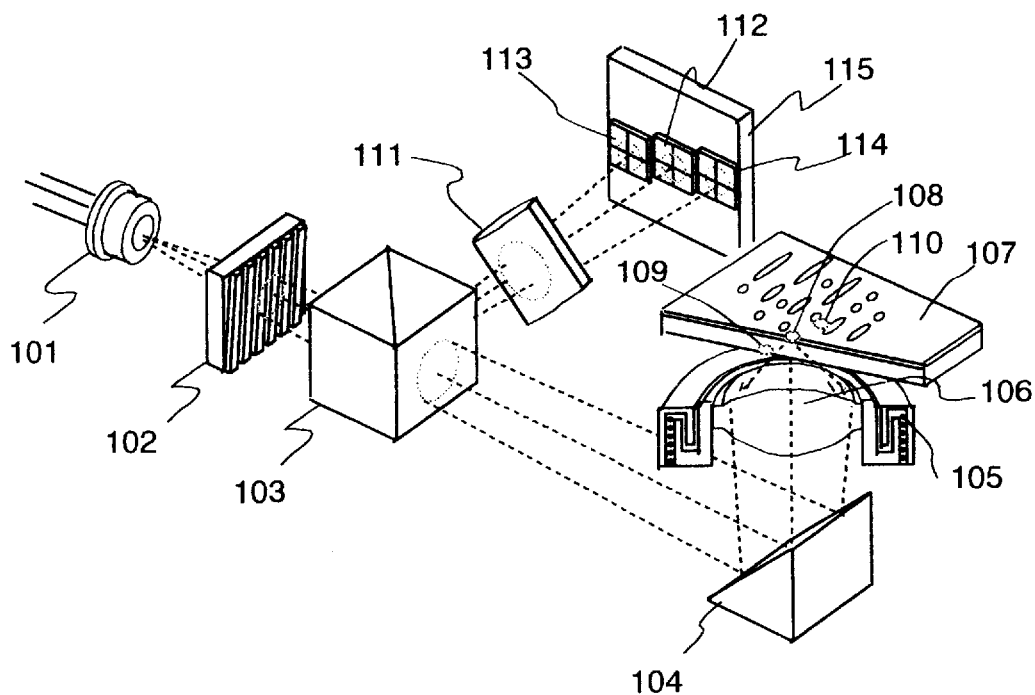
FIG. 1 is a diagram for showing a constitution of an optical system in a basic embodiment of the present invention.

FIG. 1 is a diagram for showing a constitution of an optical system in a basic embodiment of the present invention. A light beam emitted from a semiconductor laser 101 produces a diffracted light by passing through a diffraction grating 102. The diffracted light, by way of a beam splitter 103, a triangle reflection prism 104 and an objective lens 106, forms a main-spot 108 of a 0th order light and two sub-spots 109,110 of ±1st order diffracted lights on an optical disk 107. A reflected light beam, by way of the objective lens 106 and the triangle reflection prism 104 again, is reflected at the beam splitter 103. Then, the reflected light beam is provided with an astigmatism for detecting a focal point shift by a cylindrical lens 111, thus being received by an optical detector 115. The optical detector 115 is separated into a 0th order light four-divided optical detection region 112 and ±1st order diffracted lights four-divided optical detection regions 113, 114. The two kinds of optical detection regions are independent of each other in performing the detection. Here, the diffraction grating 102 is located in such a manner as to be tilted to some extent so that the ±1st order diffracted lights on the optical disk are located in such a manner as to be shifted on the both sides of the 0th order light by one-half of a guiding groove pitch.

Figure 2:
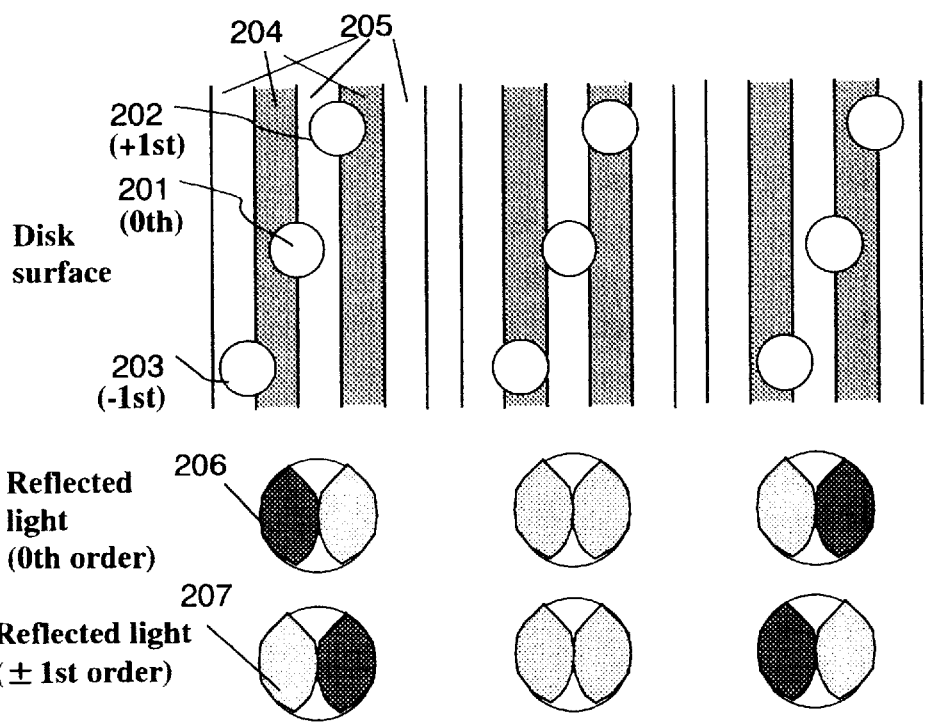
FIG. 2 is a diagram for showing locations of focused spots on an optical disk and intensity distributions of reflected light beams at that time.

FIG. 2 is a diagram for showing locations of optical spots on the optical disk and intensity distributions of reflected light beams at that time. FIG. 2 shows a case in which a 0th order light 201 and ±1st order diffracted lights 202, 203 are shifted slightly on the left side with reference to groove portions 204 and land portions 205, a case in which they are just on-track, and a case in which they are shifted slightly on the right side. At this time, intensity variations of a 0th order light-detected light beam 206 and a ±1st order diffracted lights-detected light beam 207, as illustrated in FIG. 2, are shifted in directions opposite to the directions of the above-mentioned track-shifts of the optical spots on the disk. This is because the ±1st order diffracted lights 202, 203 on the disk are located in such a manner that they are sifted with reference to the 0th order light 201 by one-half of the track pitch. There occur such light intensity distributions of the detected light beams in correspondence with positions of the optical spots on the optical disk. As described in, for example, the literatures cited earlier, this knowledge itself has been known publicly.

Figure 3:
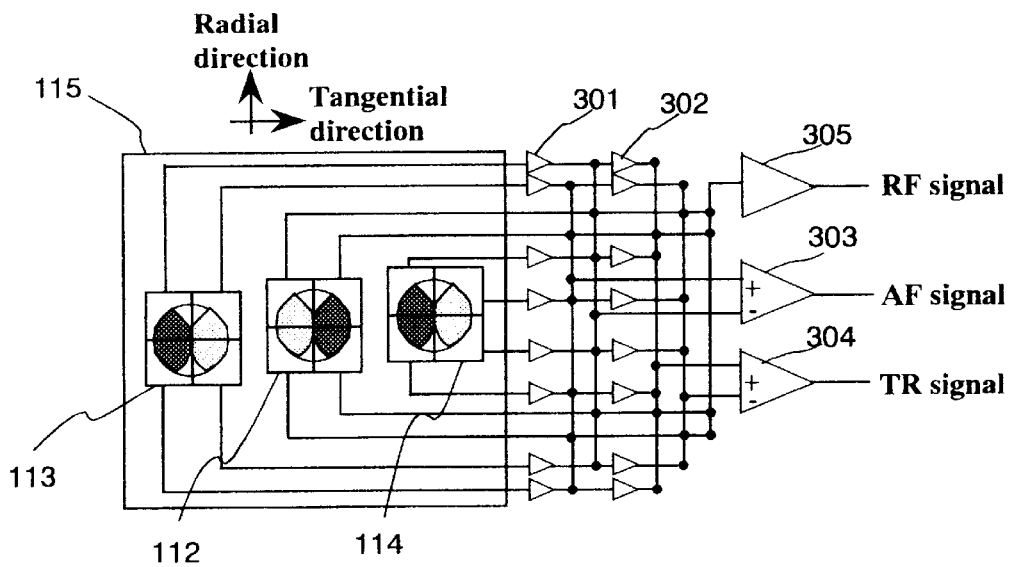
FIG. 3 is a diagram for showing a circuit calculation method of an output of a detector.

FIG. 3 is a diagram for showing a circuit calculation method of outputs of the optical detector. Incidentally, on the optical detector 115, the intensity distributions of the reflected light beams are rotated by 90 degrees because of the astigmatism for detecting a focal point shift or focus error. Here, a focus error signal (AF signal) is obtained by adding components in the same diagonal direction of corresponding divided outputs of the divided optical detector 112 for the main-spot and the divided optical detectors 113, 114 for the sub-spots, and then by calculating the differential signal thereof with the use of a differential amplifier 303. Calculating the focus error signal in this way allows only the disturbance to be canceled out because, when the focused spots cross a guiding groove on the disk, variations in intensity distribution of the sub-spots are inverted with a variation in intensity distribution of the main-spot. At this time, usually, an amount of light of the sub-spots is made smaller than that of the main-spot. Accordingly, the calculation is performed after signal outputs of the sub-spots are amplified by an amplifier 301 by an amount corresponding to the ratio between the amount of light of the sub-spots and that of the main-spot. In this embodiment, however, there exist the two sub-spots. Assuming an intensity of the main-spot as A and that of the sub-spot as B, the gain on each sub-spot, actually may take a value obtained by multiplying, by A/(2B), amplification gains of the signals by the two sub-spots with reference to the main-spot. Meanwhile, a tracking error signal (TR signal) is obtained by first adding, alternately between in the main-spot and in the sub-spots, an output for every two regions divided into the right and left in FIG. 3, and then by calculating the differential output thereof with the use of a differential amplifier 304. Calculating the tracking error signal in this way makes it possible to obtain a tracking error signal in which only the off-set components are canceled out, because, when the focused spots cross the guiding groove on the disk, the variations in intensity distribution of the sub-spots are inverted with the variation in intensity distribution of the main-spot and in addition the off-set due to the lens shift is not inverted. Here, from the above-described original location, when the main-spot is situated on a land portion, the sub-spots are situated on groove portions. This, when a width of the land portion is different from that of the groove portion, results in a difference in the amount of reflected light between the main-spot and the sub-spots, thereby making the off-set canceling insufficient. In such a case, signals of the sub-spots are amplified by an amplifier 302 so that the difference in the amount of reflected light therebetween is compensated. For example, when the information tracks exist on the land portions, the again of the amplifier 302 of the sub-spots, may take a/b where a represents a reflectance of the land portion as and b represents that of the groove portion. Also, in some cases, the output of the main-spot may be lower. In such a case, the main-spot, on the contrary, is amplified. Otherwise, the gain of the amplifier 302 is made equal to 1 or less. The above-described calculation method makes it possible to simultaneously obtain the tracking error signal without the off-set due to the lens shift and the focus error signal without the disturbance at the time of crossing the guiding groove. In the mean time, concerning a reproducing signal, a total amount of light of the main-spot is outputted using a differential amplifier 305. Incidentally, here, the optical disk employed is assumed to be an optical disk such as a reproduction-only type optical disk or a phase-varied type optical disk which allows a signal to be reproduced with the use of the amount of reflected light. However, in the case of the magneto-optical disk as well, there exists no other difference except a difference which results from defining the data signal as a differential signal between two signal outputs in which the polarized light components are split. Consequently, it is possible to detect the focus error signal and the tracking error signal with the use of the present embodiment.

Figure 4:
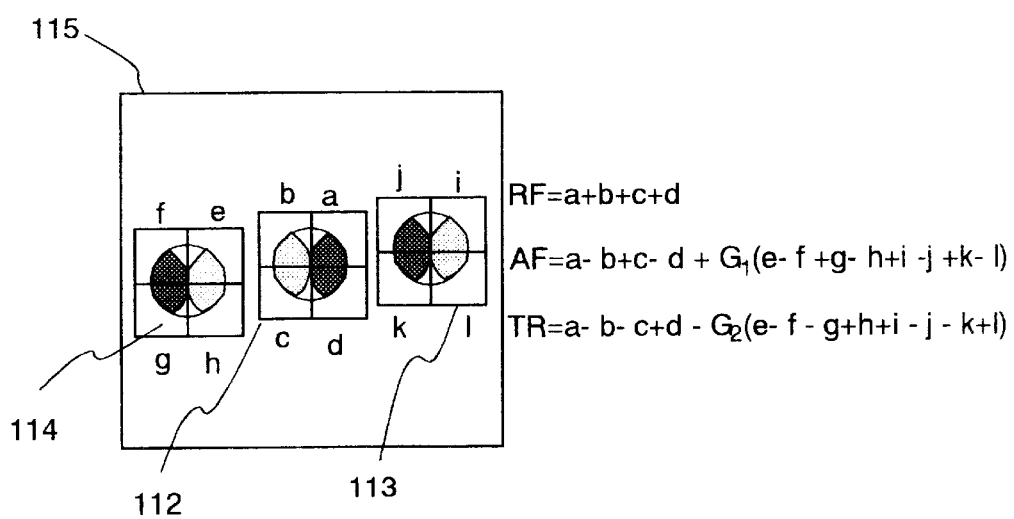
FIG. 4 is a diagram for showing a calculation method of the output of the detector.

FIG. 4 is a diagram for summarizing the calculation method at this time. As a conclusion, what should be done is just to perform the calculations as illustrated in FIG. 4 toward four outputs a, b, c, d of the 0th order light four-divided optical detection region 112 and respective four outputs e, f, g, h, i, j, k, l of the ±1st order diffracted lights four-divided optical detection regions 113, 114. Incidentally, here, a reference note RF denotes a data signal, AF a focal point shift error signal, and TR a tracking error signal.

Figure 22:
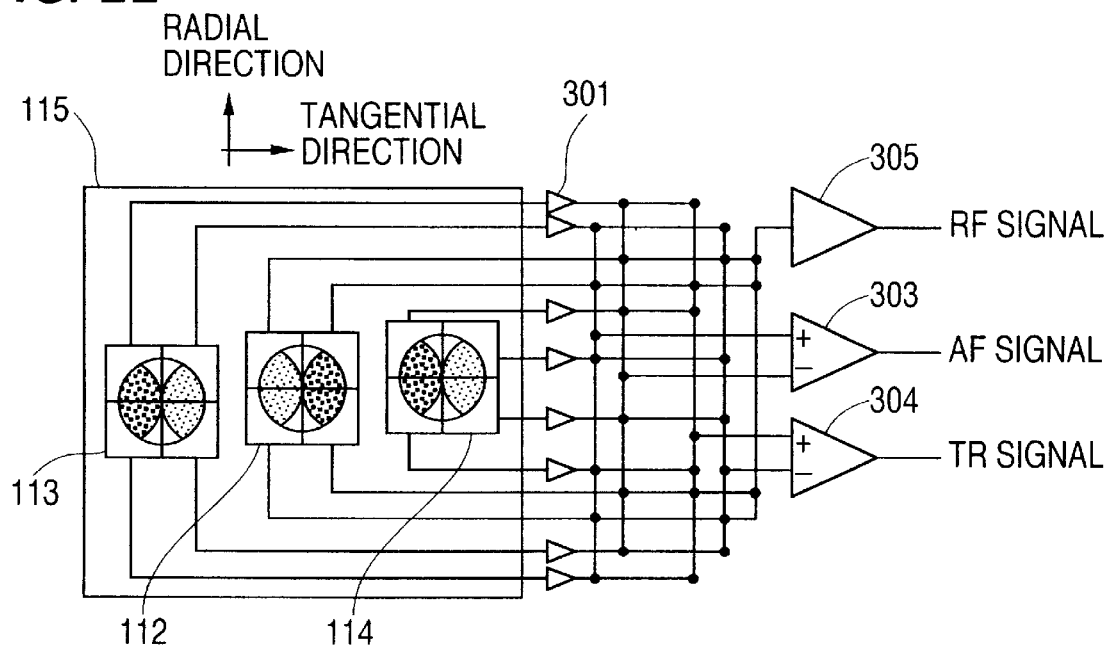
FIG. 22 is a diagram showing a modified example of the circuit calculation method of the detector output in FIG. 3.

The above-described embodiment has generally assumed the case in which the reflectances differ between an occasion when a focused spot is situated at the guiding groove and an occasion when it is situated at the guiding inter-groove. However, in the land-groove type optical disk used in the DVD-RAM disk, the width of the guiding groove is substantially equal to one-half of the track pitch, and thus the reflectances substantially equal between the occasion when a focused spot is at the groove portion and the one when it is at the land portion. This, by omitting the amplifier 302 in FIG. 3, makes it possible to simplify the circuit configuration as illustrated in FIG. 22. Incidentally, even in the land-groove type optical disk, because of the fabricating error, a difference in the reflectance in the land portion toward the groove portion can be about, at the maximum, ±10%. Concerning the difference of this extent, however, the computer simulation has demonstrated the following: When an effective diameter of the objective lens is set to be 4 mm, even if the lens shift is 0.4 mm, the track off-set turns out to be about 0.01 $\mu$m in a DVD-RAM disk the groove pitch of which is 1.48 $\mu$m. This means that, in the configuration in FIG. 22 as well, the track off-set is allowable. Conversely, provided that the allowable value of the track off-set is equal to 0.05 $\mu$m, the difference in the reflectance in the land portion toward the groove portion has been found to be about 1.6 times under the same conditions. This means that, in an ordinary optical disk other than the land-groove type optical disk, this value becomes more than two times greater. Accordingly, the configuration in FIG. 22, after all, can be applicable only to the land-groove type optical disk.

Figure 23:
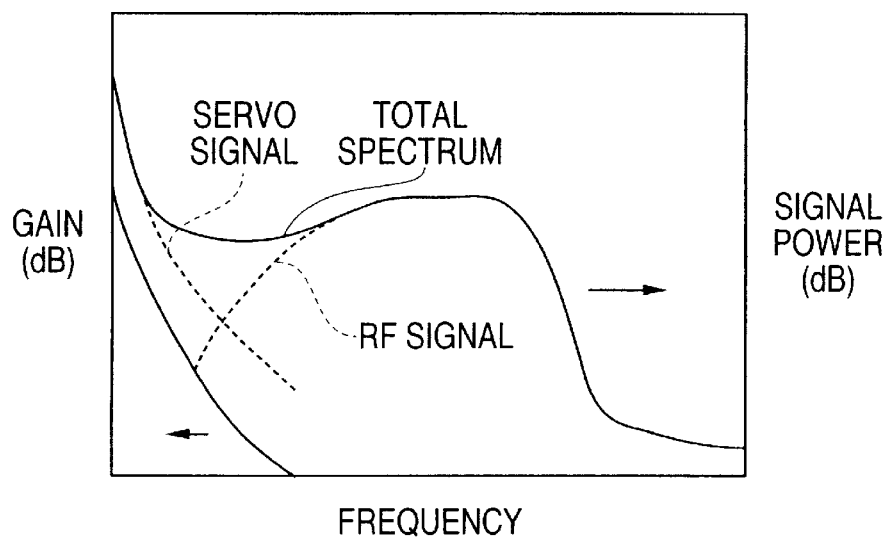
FIG. 23 is a characteristic diagram representing a frequency characteristic of a gain of an amplifier and a read-out signal intensity of the detector.

Also, in the land-groove type optical disk, there exist the information tracks at the guiding grooves as well as at the guiding inter-grooves. Consequently, when the main-spot is situated on an information track, the sub-spots, naturally, are situated on the adjacent tracks. At this time, there occurs a mixture of recorded information into the sub-spots, which has not been assumed except for the case of the land-groove type optical disk. In order to avoid this phenomenon, it is appropriate to let an amplifier 301 in FIG. 22 have a frequency characteristic as illustrated in FIG. 23. In FIG. 23, a horizontal axis in the coordinate indicates the frequency, a vertical axis on the left side indicates the frequency characteristic of a gain of the amplifier, and a vertical axis on the right side indicates an intensity of a read-out signal on information tracks in a detector. Although the read-out signal lies in a higher frequency bandwidth as compared with control signals such as the tracking error signal or the focus error signal, a signal actually detected by the detector is a one resulting from synthesizing these signals. Here, by letting the amplifier have a characteristic that the gain becomes lower in the read-out signal bandwidth, it is possible to obtain a control signal without the disturbance.

The optical disk in the embodiment mentioned upper was not specialized to land-groove type optical disk. In the case of land-groove type optical disk such as DVD-RAM, the reflectance of the light is substantially equal when between the focused spot on the optical disk is in groove and in inter-groove. Therefore the amplifier 302 in the FIG. 3 can be omitted as in FIG. 22. Of course, even in the land-groove disk, these reflectances have some error approximately 10%. However, it is examined by computer simulation that this amount of deviation is allowable.

In FIG. 23, the frequency spectrum of the readout signal, servo control signal, and frequency transfer characteristics of the amplifiers in FIG. 22 is shown. The amplifier has the frequency transfer characteristics to substantially cut off the frequency band of stored information signal in the optical disk.

Next, an analytical explanation will be given below concerning the reason why such a calculation method makes it possible to cancel the tracking error signal off-set due to the movement of the objective lens. According to "Journal of Optical Society of America", 1979, Vol. 69, No.1, pp.4–24, distribution of a reflected light beam by means of the periodic structure of the optical disk is obtained as follows: In scalar diffraction approximation, products of Rm, i.e. m-th order Fourier coefficients of reflectance distribution of the optical disk, and a (x, y), i.e. complex amplitude distribution of an incident light beam, are shifted by a quantity of mNA/Pλ (NA: numerical aperture, P: period of guiding grooves, λ: wavelength), i.e. distribution shift due to a m-th order diffraction, and, after being multiplied by exp (i2 πmu$_o$/P), i.e. phase component based on a spot position of the main spot u$_o$, are added, thus obtaining the distribution. Namely, the following Equation (1) is obtained:

$$a'(x, y) = \sum_{m} R_m a\left(x - \frac{mNA}{P\lambda}, y\right) e^{i2\pi \frac{m}{P} u_0} \tag{1}$$

$a(x,y)$: Complex amplitude distribution of incident light NA: Numerical aperture $P$: Period of guiding grooves $m$: Order of diffraction by grooves $\lambda$: Wavelength $u_0$: Spot position in radial direction Here, Rm, which corresponds to a complex amplitude of a m-th order diffracted light at the time when a parallel light beam with an amplitude 1 is launched into the optical disk at an angle perpendicular thereto, is represented by Equation (2):

$$R_m = \frac{1}{P} \int_{-P/2}^{P/2} R(u) e^{-i2\pi \frac{m}{P} u} du \tag{2}$$

$u$: Radial coordinate on the disk $R(u)$: Distribution of complex amplitude reflectance of disk surface and, in particular, in the case of rectangular grooves with a width w and a groove depth d normalized by the wavelength, Rm is represented by Equation (3):

$$R_m = \text{sinc} m - \frac{w}{P}(1 - e^{-i4\pi d}) \text{sinc} \frac{mw}{P} \tag{3}$$

$w$: Guiding groove width (3)

$d$: Groove depth normalized by wavelength

Incidentally, here, sinc X has the relation expressed by Equation (4):

$$\text{sinc } x = \begin{cases} \frac{\sin \pi x}{\pi x} & (x \neq 0) \\ 1 & (x = 0) \end{cases} \tag{4}$$

Using these equations, and provided that the incident light beam has no aberration and the amplitude is uniform within an objective: lens pupil surface, interference intensities between the 0th order light and the ±1st order diffracted lights by means of the periodic guiding grooves in the optical disk are represented by Equation (5):

$$I_{0,\pm 1}(x, y) = |R_0|^2 + |R_{\pm 1}|^2 + 2|R_0||R_{\pm 1}|\cos\left(\varphi \mp \frac{2\pi}{P} \cdot u_0\right) \tag{5}$$

Incidentally, here, ∅ has the relation expressed by Equation (6):

$$\emptyset = arg(R_{\pm 1}) - arg(R_O) \tag{6}$$

Using these equations, a tracking error signal TR according to a push-pull method at the time when there exists no movement of the lens is represented by Equation (7):

$$TR = S(I_{0,+1} - I_{0,-1}) \tag{7}$$
$$= 4S|R_0||R_{\pm 1}|\sin\varphi \sin 2\pi \frac{u_0}{P}$$
$$= 4S\frac{w}{P^2} \text{sinc} \frac{w}{P} \text{sinc} 4\pi d \sin 2\pi \frac{u_0}{P}$$

$S$: Area size of interference region of 0th and ±1st order diffraction

Figure 5:
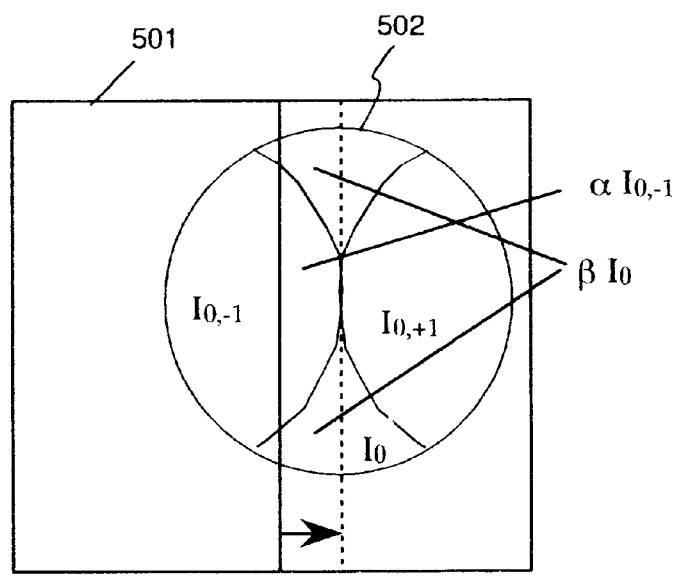
FIG. 5 is a diagram for explaining a tracking error signal off-set due to movement of an objective lens.

Here, as shown in FIG. 5, assuming that an optical spot 502 on a dual-divided optical detector 501 is moved by the movement of the objective lens, from an increase or a decrease in the amount of received light in each divided region of the dual-divided optical detector 501, a tracking error signal TR according to the ordinary push-pull method is represented by Equation (8), using parameters α (0<α<1), β (0<β<1) attributed to the movement of the objective lens:

$$TR(\alpha, \beta) = S(I_{0,+1} + \alpha I_{0,-1} + \beta I_0 - (1-\alpha)I_{0,-1} - (1-\beta)I_0) \tag{8}$$
$$= TR(0, 0) + 2S(\alpha I_{0,-1} + \beta I_0)$$

The second term in the right hand side corresponds to the off-set. Here, in Equation (5), if, for example, the sub-spots by means of the diffraction grating are shifted by one-half of the track pitch, a phase inside cos in the third term in the right hand side is shifted by π. Accordingly, at this time, I'$_{0,\pm 1}$ (x, y), i.e. interference intensities of the sub-spots, are represented with reference to u$_o$, i.e. the spot position of the main spot, by Equation (9):

$$I'_{0,\pm 1}(x, y) = |R_0|^2 + |R_{\pm 1}|^2 - 2|R_0||R_{\pm 1}|\cos\left(\varphi \mp \frac{2\pi}{P} u_0\right) \tag{9}$$

Moreover, in Equation (7), too, if the sub-spots are shifted by one-half of the track pitch, the tracking error signal is inverted, too. Accordingly, TR' (α, β), i.e. a tracking error signal of the sub-spots at the time when there exists the movement of the lens, is represented by Equation (10):

$$TR'(\alpha, \beta) = -TR(0,0) + 2S(\alpha I'_{0,-1} + \beta I_0) \tag{10}$$

Consequently, by subtracting the tracking error signal of the sub-spots from the tracking error signal of the main-spot, a signal expressed by Equation (11) is obtained:

$$TR(\alpha, \beta) - TR'(\alpha, \beta) = 2TR(0, 0) + 2S\alpha(I_{0,-1} - I'_{0,-1}) \tag{11}$$

$$= 2TR(0, 0) + 4S\alpha|R_0||R_{\pm 1}|\cos\left(\varphi + \frac{2\pi}{P}u_0\right)$$

Accordingly, when an off-track of the main-spot is equal to 0, namely, $u_o=0$, the off-set is represented by the following Equation (12):

$$\text{Offset} = 4S\alpha|R_0||R_{\pm 1}|\cos\varphi \quad (12)$$

$$= 4S\alpha\frac{w}{P^2}\text{sinc}\frac{w}{P}\left(2\frac{w}{P}-1\right)(1-\cos 4\pi d)$$

Consequently, if the width of the groove is not one-half of the track pitch, the off-set remains. This is caused by the fact that, as seen from the second term in the right hand side in the upper stage of Equation (11), when the main-spot is on-track, the interference intensity thereof differs from interference intensities of the sub-spots. Thus, by anticipating this intensity variation and setting in advance a gain $G_2$ shown in FIG. 4, it is possible to cancel the off-set. Also, in the case of an optical disk such as the DVD-RAM in which the land-groove type optical disk is employed, the off-set is canceled out automatically without setting such a gain.

The above-described description has been given concerning the effect of canceling the off-set in the tracking error signal. The method employed therefor is that a light beam the interference phase of which is inverted is detected simultaneously. By the way, this method also cancels out the disturbance into the focus error signal when an optical spot crosses the guiding groove, which appears as a serious problem in the astigmatic focal point shift detecting method. The principle thereof will be explained below: First of all, there exist two major causes concerning the above-mentioned disturbance in association with the crossing over the track in the astigmatic focal point shift detection. One is astigmatism exerted upon the optical spot on the disk. The other is a shift in the four-divided optical detector. Here, the explanation will be given by employing, as the example, a mixture of the disturbance caused by the astigmatism. Using $W_{22}$, i.e. an aberration coefficient of astigmatism, and $\phi$, i.e. direction angle of astigmatism, a wave surface having the astigmatism is represented by Equation (13):

$$W(\rho, \theta) = W_{22}\rho^2 \cos 2(\theta-\phi) \quad (13)$$

ρ: Normalized radial coordinate in the pupil θ: Polar angle coordinate in the pupil $W_{22}$: Aberration coefficient of astigmatism φ: Direction angle of astigmatism This can be rewritten into the Equation (14), using x, y coordinates of an effective diameter in the pupil:

$$W(x, y) = W_{22}\{(x^2-y^2)\cos 2\phi + 2xy \sin 2\phi\} \quad$$

x,y: Normalized Cartesian (effective diameter) coordinates in the pupil (14)

Accordingly, assuming that the wave surface having the astigmatism is diffracted by the optical disk and the 0th order light and the ±1st order diffracted lights thereof are shifted by ±δ and then are overlapped with each other on the objective lens pupil surface, a phase difference in the interference added by the astigmatism can be approximated as a form of Equation (15):

$$\Delta W = W(x \pm \delta, y) - W(x, y) \quad (15)$$

$$\cong \pm \frac{\partial W}{\partial x}\delta$$

$$= \pm 2W_{22}(x\cos 2\phi + y\sin 2\phi)\delta$$

Then, using this equation, interference intensities between the 0th order light and the ±1st order diffracted lights are represented by Equation (16):

$$I_{0,\pm 1}(x, y) = |R_0|^2 + |R_{\pm 1}|^2 + 2|R_0||R_{\pm 1}|\cos\left(\Delta W + \varphi \mp \frac{2\pi}{P}u_0\right) \quad (16)$$

Figure 6:
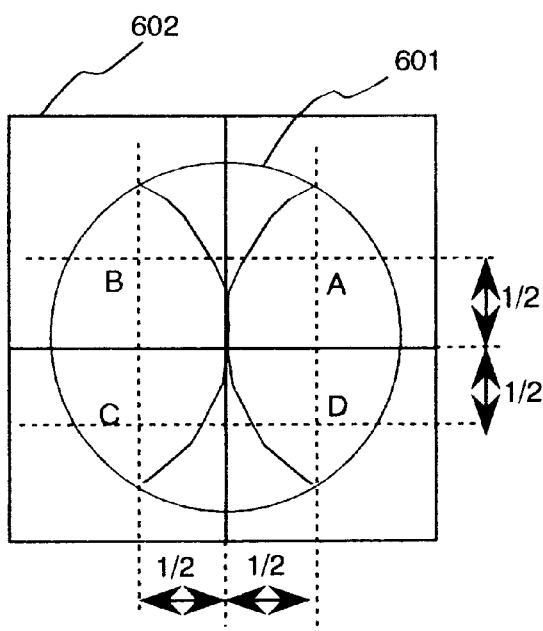
FIG. 6 is a diagram for explaining an disturbance into a focus error signal due to astigmatism.

Here, as illustrated in FIG. 6, if representative points A, B, C, D are picked up in a reflected light beam 602, which has astigmatism and is reflected from the optical disk, interference intensities at these points are represented by Equations (17) to (20), using Equation (16):

$$I_A = C + \alpha\cos\left\{W_{22}\delta(\cos 2\phi + \sin 2\phi) + \varphi - \frac{2\pi}{P}u_0\right\} \quad (17)$$

$$I_B = C + \alpha\cos\left\{W_{22}\delta(\cos 2\phi - \sin 2\phi) + \varphi + \frac{2\pi}{P}u_0\right\} \quad (18)$$

$$I_C = C + \alpha\cos\left\{W_{22}\delta(\cos 2\phi + \sin 2\phi) + \varphi + \frac{2\pi}{P}u_0\right\} \quad (19)$$

$$I_D = C + \alpha\cos\left\{W_{22}\delta(\cos 2\phi - \sin 2\phi) + \varphi - \frac{2\pi}{P}u_0\right\} \quad (20)$$

Assuming that, basically, these intensities appear without being varied on the detectors for detecting the focus error, an disturbance which, as shown in Equation (21), $$AF = (I_A + I_C) - (I_B + I_D) \quad (21)$$

$$= -2\alpha\sin(W_{22}\delta\cos 2\phi + \varphi)\sin(W_{22}\delta\sin 2\phi)\cos\left(\frac{2\pi}{P}u_0\right)$$

is cos waveform-like in shape with reference to the off-track $u_o$ is mixed into the focus error signal. Here, a focused spot, in which variations in intensity distribution of a reflected light beam reflected when the focused spot crosses the guiding groove are inverted, is generated simultaneously and is added to the focus error signal. This transaction eventually means that a quantity, which is obtained by shifting phase φ by π and thus by inverting a sign of the first sin in Equation (21), is added, and accordingly the disturbance is canceled out.

The difference in reflectance between the guiding groove and the guiding inter-groove has required the adjustment of the gain with the use of, for example, the width of the guiding groove. For instance, the above-described adjustment has become necessary for the canceling of the tracking error signal off-set in the differential push-pull method. However, in the canceling of the disturbance mixed into the focus error signal, the gain adjustment is unnecessary.

Figure 7:
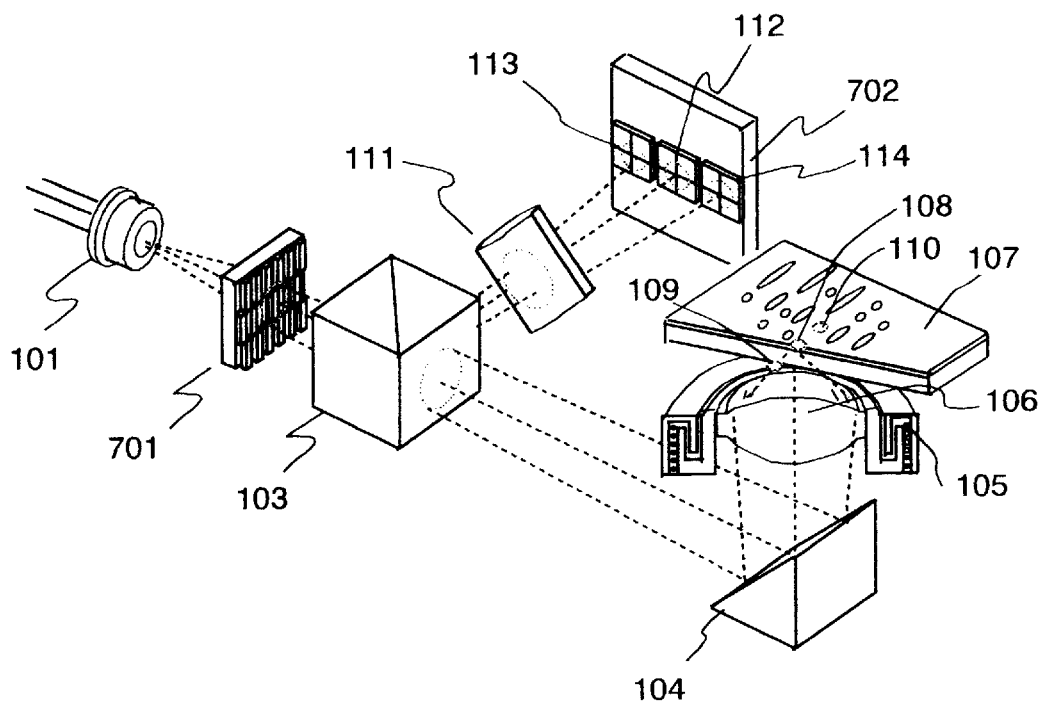
FIG. 7 is a diagram for showing a constitution of an optical system in an embodiment in which a phase-inverted diffraction grating is employed.

FIG. 7 shows another embodiment for simultaneously detecting the light beam in which the polarities of intensity distribution variations of the reflected light beam reflected when the focused spot on the optical disk crosses the guiding groove are inverted. In this embodiment, a linear diffraction grating 701, which is located in parallel to a radial direction of the optical disk, is employed. Consequently, it turns out that the ± 1st order diffracted lights formed by the diffraction grating on the optical disk are located on the same track as the 0th order light. Also, consequently, three four-divided optical detection regions 112, 113, 114 constituting an optical detector 702 for detecting the reflected light beam are located in parallel to a tangential direction of the optical disk.

Figure 8:
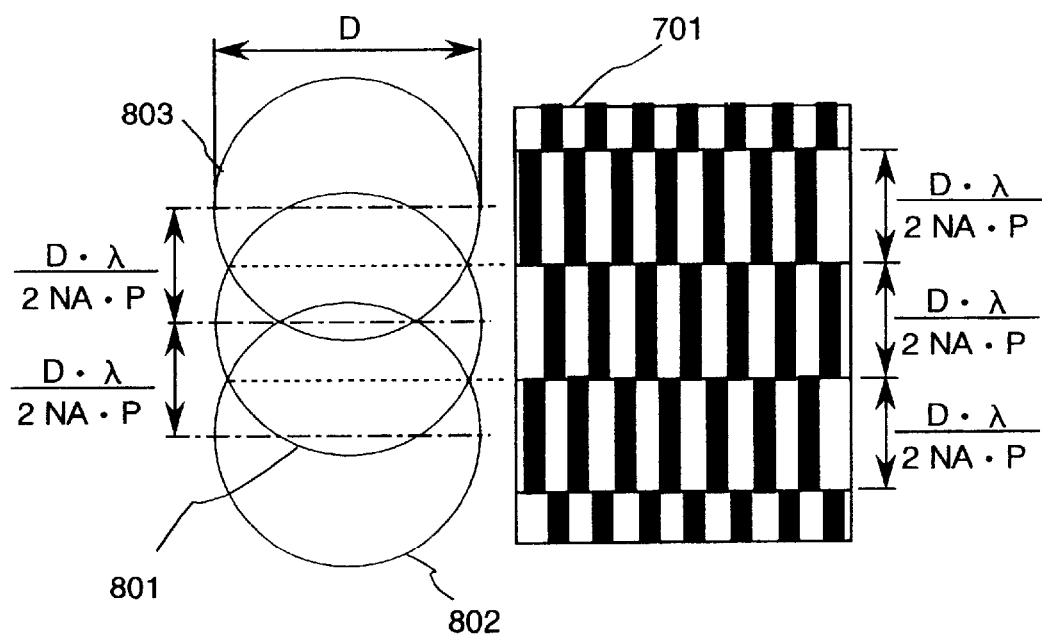
FIG. 8 is a diagram for explaining a detailed structure of the phase-inverted diffraction grating.

Next, using FIG. 8, the description will be given concerning a detailed structure of the diffraction grating 701 employed in the present embodiment. The diffraction grating is constituted so that, as illustrated in FIG. 8, phase of the gratings is inverted with a period of $D\lambda/(2NA \cdot P)$ with reference to P, i.e. a period of the guiding grooves, NA, i.e. numerical aperture of the objective lens, and D, i.e. an effective light beam diameter for a diffraction grating-inserted position. This period is equal to an interval which is determined by shifts of reflected light beams of ±1st order diffracted lights 802, 803 toward a 0th order light 801 of a diffracted light formed by the guiding grooves of the optical disk. In a diffracted light formed by this kind of diffraction grating, phase of a wave surface of the diffracted light is shifted by an amount of $\pi$ for each period. Remembering that a diffraction grating is, originally, a hologram, this phenomenon can be understood easily. The hologram is produced by performing, on a film such as a photographic dry plate, exposure and development processings of an interference fringe formed by two high coherent lights such as laser lights. When the hologram is irradiated with one of the lights at the time of performing the exposure processing thereto, the other light is reproduced as a diffracted light by means of the hologram. Then, as described above, if the interference fringe is formed by causing an interference to occur between the light the wave surface of which is shifted periodically by one-half of the wavelength and the light the wave surface of which is flat, it is quite natural that the interference fringe should reflect the phase shift and discontinuously form a step of one-half of the fringe. Accordingly, if, conversely, the light the wave surface of which is flat is launched into such a diffraction grating, it turns out that wave surface of the diffracted light is shifted periodically by one-half of the wavelength.

Figures 9, 10:
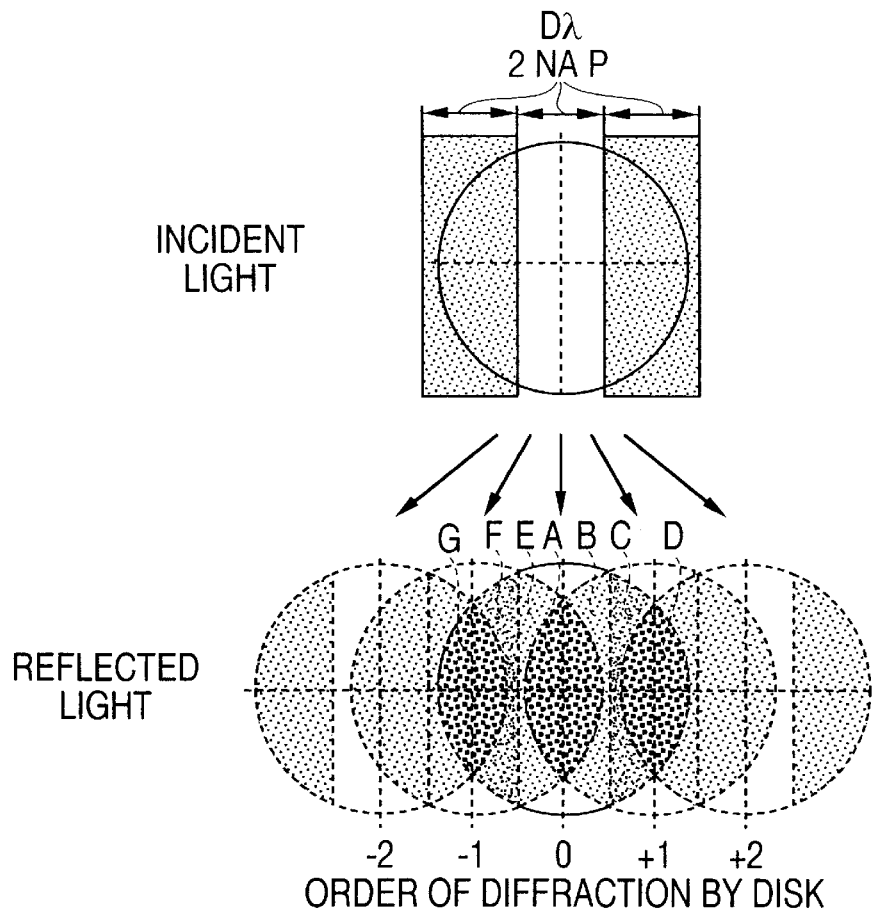
FIG. 9 is a diagram for explaining a manner in which phase shift regions are overlapped in diffraction of a phase-inverted light by means of optical disk guiding grooves.
FIG. 10 is a diagram for showing interference phase differences added to an optical disk diffracted light by means of the phase-inverted diffraction grating.

FIG. 9 is a diagram for explaining a manner in which, when a diffracted light formed by the phase-inverted diffraction grating is further diffracted by the guiding grooves of the optical disk, phase shift regions of the resultant diffracted light are overlapped. The diffracted light by means of the phase-inverted diffraction grating is further diffracted by the guiding grooves of the optical disk, and the 0th order light and the ±1st order diffracted lights are overlapped with each other. However, between the diffracted lights which are adjacent to each other, such as the 0th order light and the ±1st order diffracted lights, the phase shift regions are in contact with each other without being-overlapped. FIG. 10 summarizes phase differences added by the phase-inverted diffraction grating at this time between any two of diffraction orders included in each of the regions indicated by a, b, c, . . . in FIG. 9. FIG. 10 shows that phase differences between the lights which have adjacent diffraction orders and make a contribution to the tracking error signal, such as the 0th order light and the ±1st order diffracted lights, are equal to $\pi$ without exception. Moreover, phase differences between the lights the difference in the diffraction orders of which is equal to 2, such as the 0th order light and the ±2nd order diffracted lights, are equal to 0. Accordingly, concerning the phase differences in the interference shown in the Equation (5), without causing the sub-spots to be off-track by one-half of the track pitch, it is possible to embody inversion of the interference intensities which is equivalent thereto. This transaction, even if storage marks exist asymmetrically on the both sides of the central spot, brings about no asymmetry in an amount of reflected light of the sub-spots. Consequently, it becomes possible to further stabilize the effect of canceling the off-set in the tracking error signal or the effect of canceling the disturbance into the focus error signal.

Figure 11:
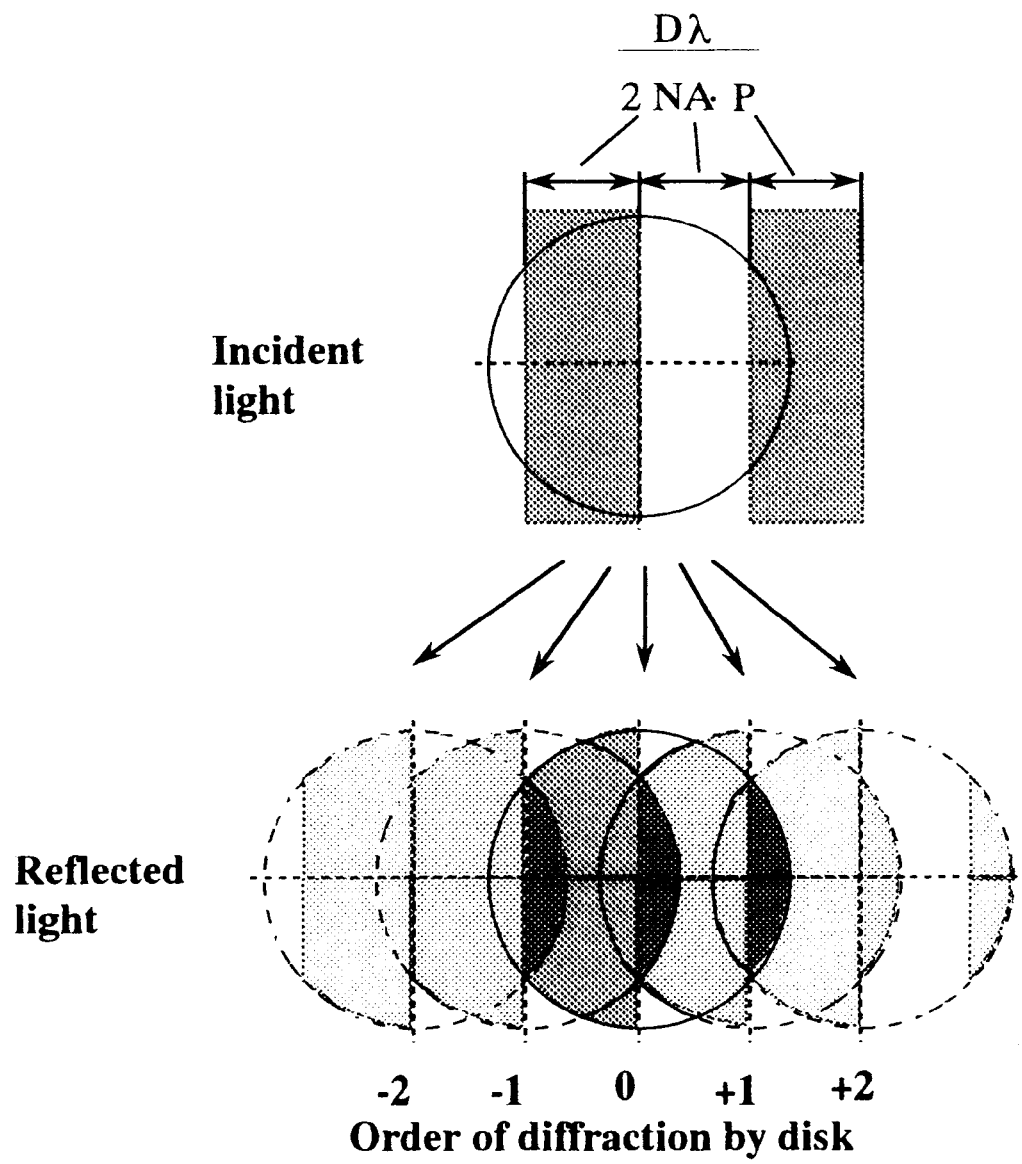
FIG. 11 is a diagram for explaining a manner in which, when the movement of the objective lens exists, phase shift regions are overlapped in diffraction of a phase-inverted light by means of optical disk guiding grooves.

Here, the phase-inverted diffraction grating is not integrated with the objective lens. Accordingly, it turns out that, when the objective lens moves following the decentering of the optical disk, an optical axis of the phase-inverted diffraction grating and that of the objective lens are relatively shifted with each other. FIG. 11, which indicates the phase shift regions in this case, shows that the movement of the objective lens, even if it occurs, results in a mere movement of connected portions between the phase shift regions, thus bringing about no obstacle to the inversion of the interference intensities.

Figure 12:
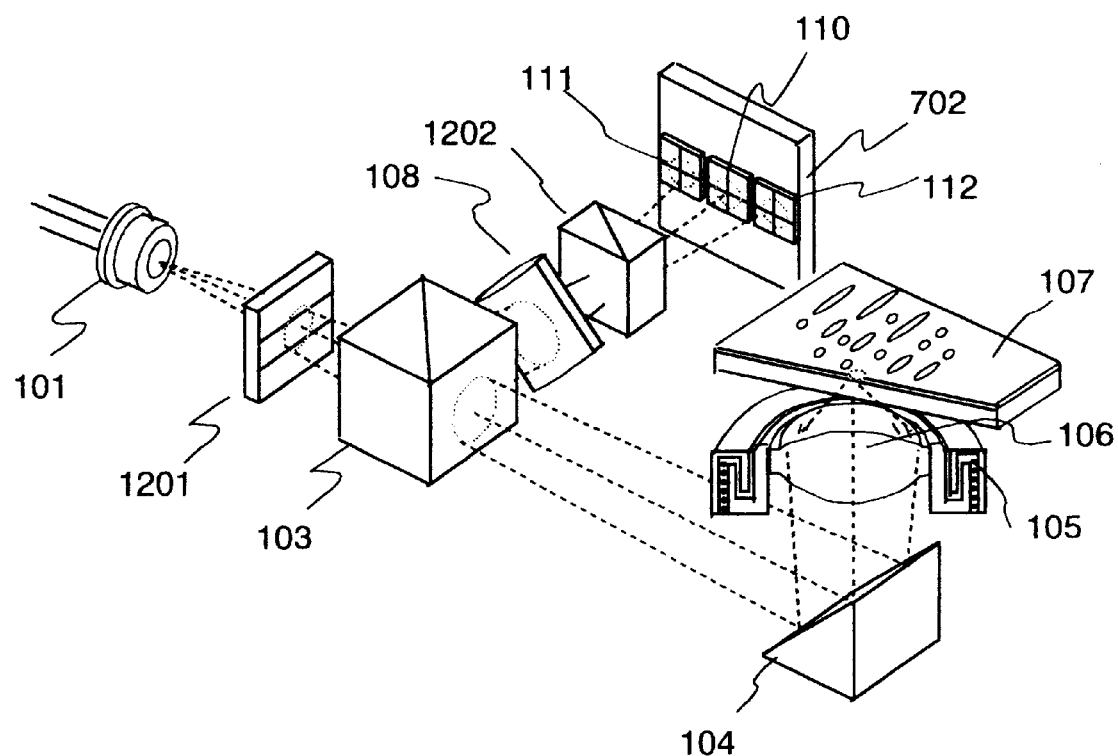
FIG. 12 is a diagram for showing a constitution of an optical system in an embodiment of the present invention in which a polarizing phase shifter is employed.

FIG. 12 shows still another embodiment for simultaneously detecting the light beam in which the polarities of intensity distribution variations of the reflected light beam reflected when the focused spot on the optical disk crosses the guiding groove are inverted. Here, instead of the phase-inverted diffraction grating in FIG. 7, a polarizing phase shifter 1201 is employed. The polarizing phase shifter 1201 inverts a phase of only a linearly polarized light component, which is polarized in a specific direction and launched into the polarizing phase shifter, in regions of a period of $\lambda D/(2NA \cdot P)$. Then, the linearly polarized light component is split and detected just in front of an optical detector 702, using a 3-beam Wollaston prism 1202. At this time, unlike the case of the phase-inverted diffraction grating, there occurs no sub-spots, and thus there exists only one optical spot on an optical disk 107. This condition makes it possible to reduce a loss in the amount of light caused by the sub-spots, thus being able to constitute an optical head suitable for the writable optical disks.

Figure 13:
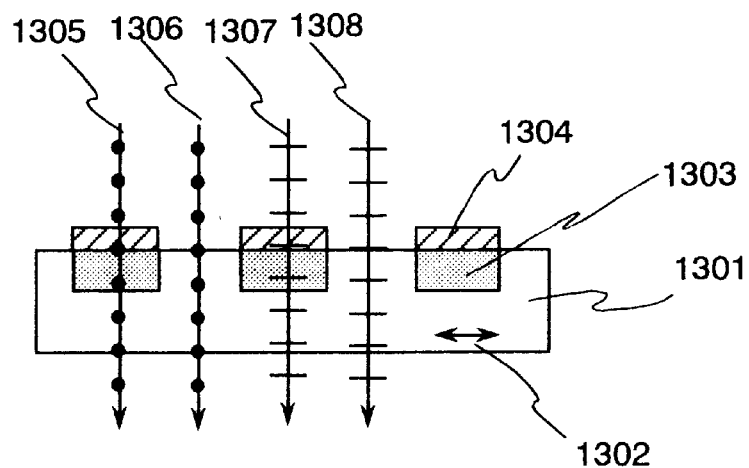
FIG. 13 is a diagram for explaining the principle of the polarizing phase shifter.

FIG. 13 is a diagram for explaining the principle of the polarizing phase shifter. Here, an example using lithium niobate ($LiNbO_3$) is presented. A lithium niobate substrate 1301 has a principal axis 1302 having a refractive index anisotropy in the direction indicated in FIG. 13. Then, proton exchanged regions 1303 are formed in the substrate in accordance with grating patterns. Moreover, in accordance with the grating patterns, dielectric material layers 1304 are formed. At this time, a phase difference $\phi_o$ between ordinary rays 1305, 1306 which are each launched into the grating patterns and therebetween, and a phase difference $\phi_e$ between extraordinary rays 1307, 1308 which are each launched into the grating patterns and therebetween, are represented as the following equations, respectively:

$$\phi_o = \frac{2\pi}{\lambda}\{(n_d - 1)T_d + \Delta n_o T_p\} \tag{22}$$

$$\phi_e = \frac{2\pi}{\lambda}\{(n_d - 1)T_d + \Delta n_e T_p\}$$

$\lambda$: Wavelength $n_d$: Refractive index of dielectric material layer $T_d$: Thickness of dielectric material layer $\Delta n_o$: Change of the ordinary refractive index of lithium niobate by proton exchange (=−0.04)

$\Delta n_e$: Change of the extraordinary refractive index of lithium niobate by proton exchange (=0.12)

$T_p$: Depth of proton exchanged region

Here, with the diffraction efficiency taken into consideration, setting the respective phase differences to be appropriate design values and solving Equation (22) as simultaneous linear equations with $T_d$, i.e. a thickness of the dielectric material layers, and $T_p$, i.e. a depth of the proton exchanged regions, as the unknowns, the solutions are represented by Equation (23):

$$T_p = \frac{\lambda}{2\pi}\phi_o - \frac{\phi_e}{\Delta n_o - \Delta n_e} \quad (23)$$

$$T_d = \frac{\lambda}{2\pi}\Delta n_o \phi_e - \frac{\Delta n_e \phi_o}{(n_d - 1)(\Delta n_o - \Delta n_e)}$$

which means that it is possible to design a polarizing grating which allows desirable phase differences to be created concerning the ordinary rays and the extraordinary rays independently of each other. For example, if the desirable result is that: the wavelength $\lambda=0.66$ $\mu$m, the refractive index of the dielectric material layers $n_d=2.2$, $\phi_o=0°$, and $\phi_e=+180°$, it will do to let $T_p=2.06$ $\mu$m and $T_d=0.07$ $\mu$m. Taking the values in this way makes it possible to selectively shift the phase concerning the proton exchanged regions by an amount of $\pi$, thus being able to expect the same offset canceling effect as that in the above-described embodiments.

Figure 14:
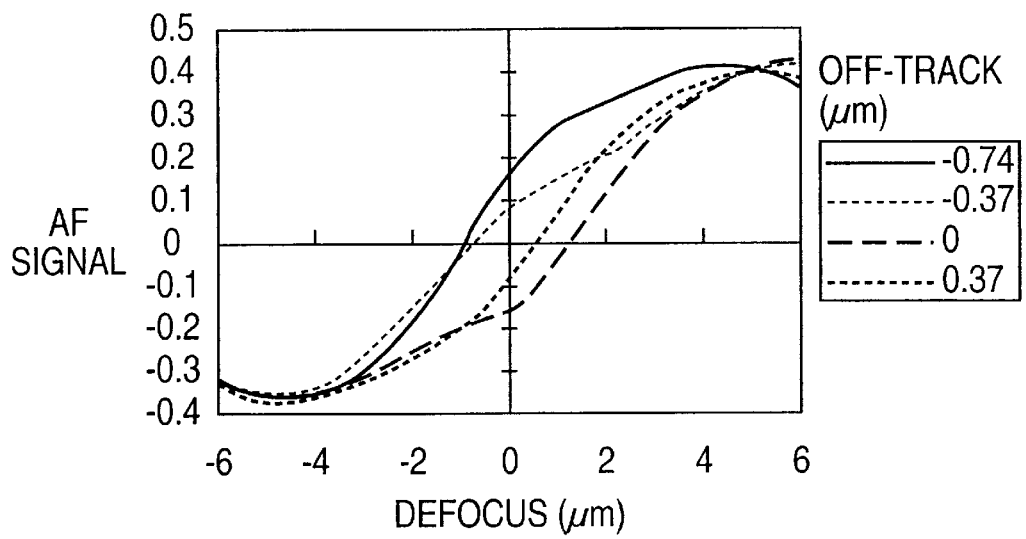
FIG. 14 is a diagram for explaining calculation of an disturbance due to an ordinary crossing over a guiding groove by means of a focus error signal.
Figure 15:
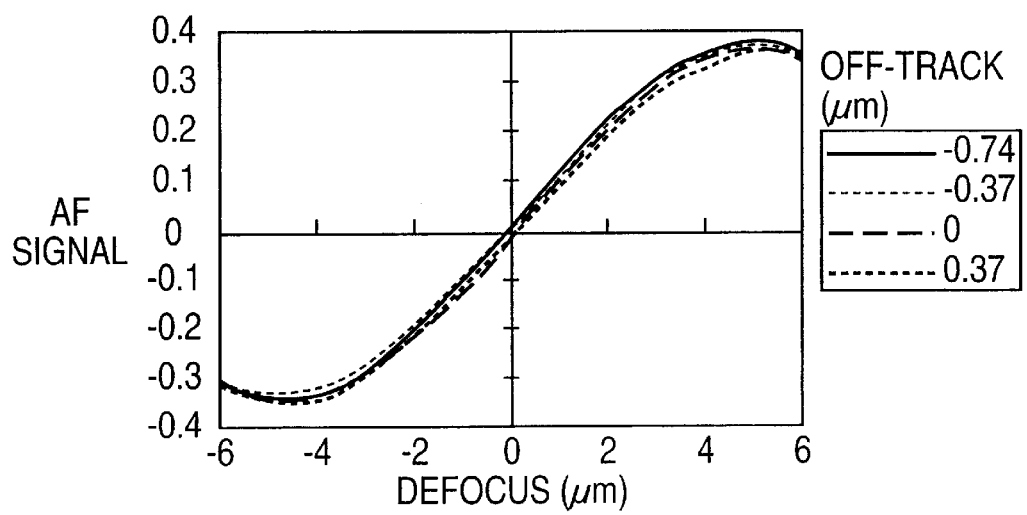
FIG. 15 is a diagram for explaining calculation of an disturbance due to a crossing over a guiding groove by means of a focus error signal at the time of employing the phase-inverted diffraction grating.
Figure 16:
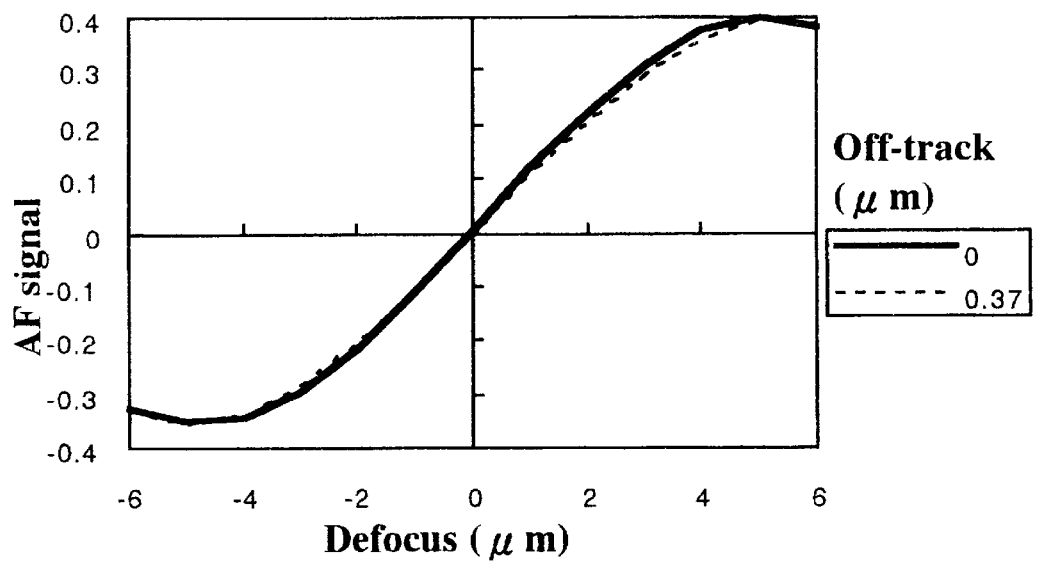
FIG. 16 is a diagram for explaining calculation of an disturbance due to a crossing over a guiding groove by means of a focus error signal in a differential push-pull method.

The description will be given below concerning a canceling effect obtained by a scalar diffraction simulation toward an disturbance in a focus error detection signal when a focused spot crosses the guiding groove and a canceling effect obtained by the scalar diffraction simulation toward an off-set which accompanies the movement of the objective lens. FIG. 14 shows a focus error signal at the time when there exist the astigmatism, a spherical aberration and detector deviations in a complex state in the ordinary focus error detecting system. The central portion is swelled, which demonstrates that there occurs a considerably large disturbance. On the other hand, FIG. 15 shows a calculation result on the assumption that the phase-inverted diffraction grating is used. This demonstrates that almost all of the disturbance is canceled out. FIG. 16 shows a focus error signal obtained by adding focus error signals of the main-spot and of the sub-spots according to the differential push-pull method. This demonstrates that almost all of the disturbance can be canceled out.

Figure 17:
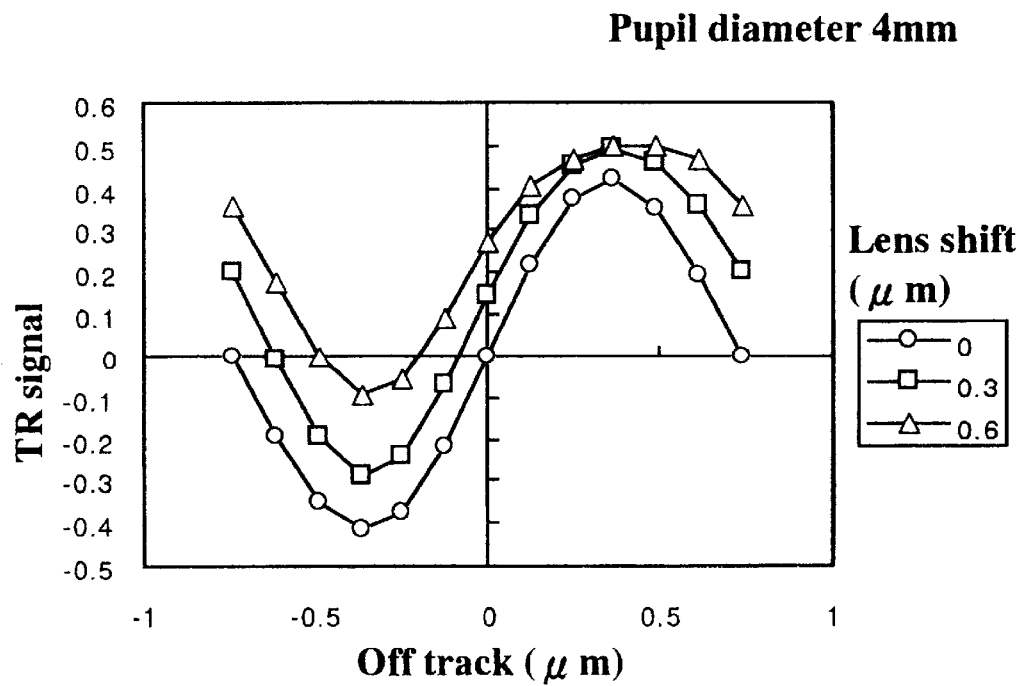
FIG. 17 is a diagram for explaining lens shift characteristics of a tracking error signal with the use of an ordinary detecting light beam for a focus error signal.
Figure 18:
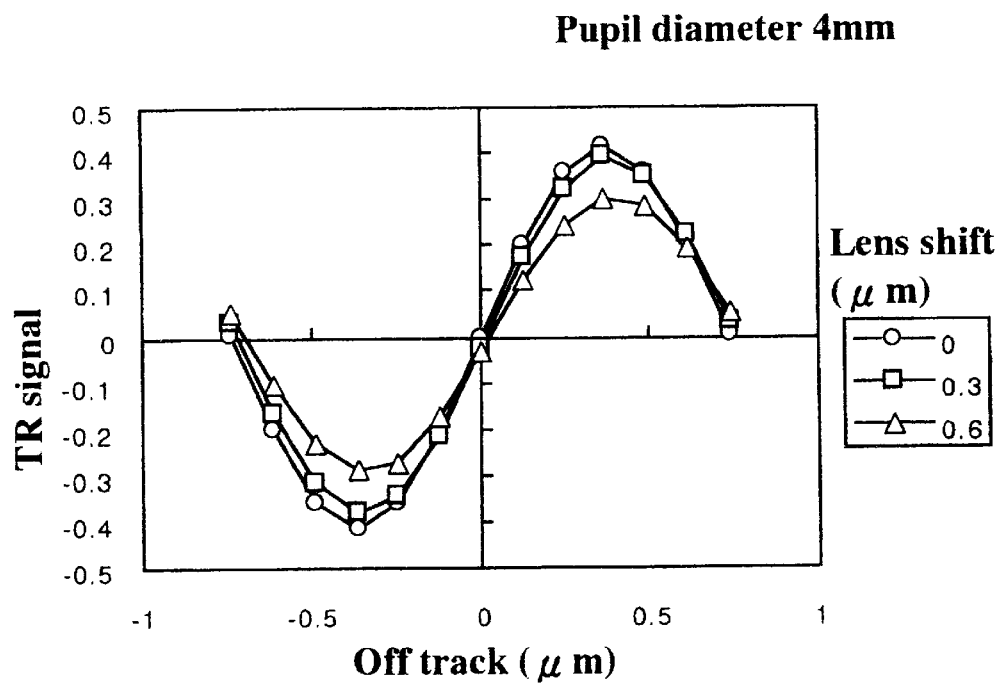
FIG. 18 is a diagram for explaining lens shift characteristics of a tracking error signal with the use of a detecting light beam for a focus error signal at the time of employing the phase-inverted diffraction grating.
Figure 19:
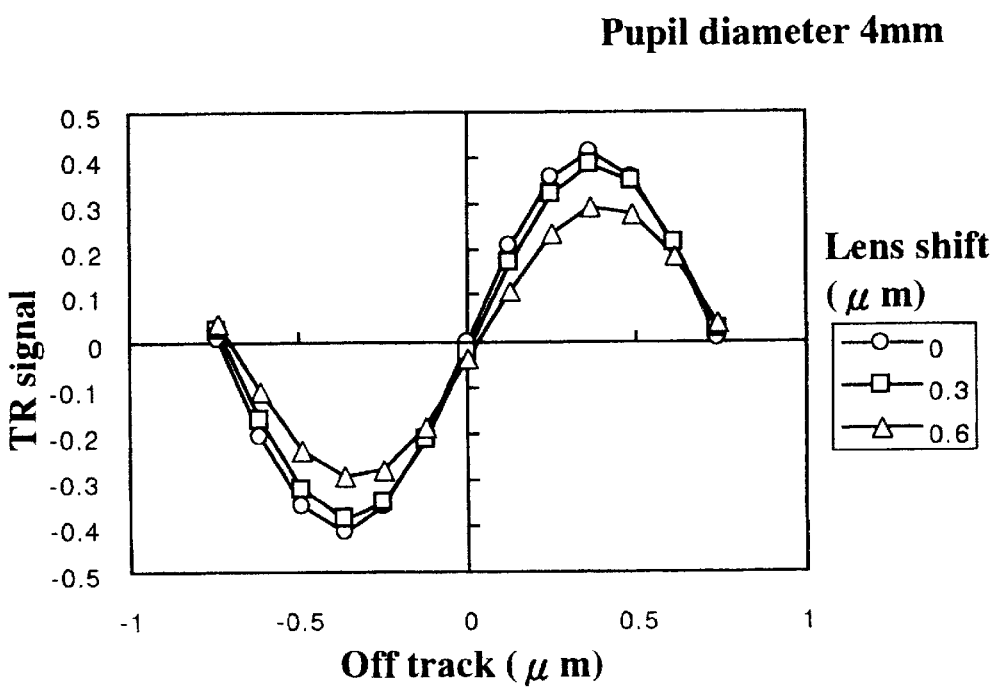
FIG. 19 is a diagram for explaining lens shift characteristics of a tracking error signal with the use of a detecting light beam for a focus error signal in the differential push-pull method.

FIG. 17 shows a case in which, with the objective lens being moved and in the ordinary astigmatic focus error detecting method, a tracking error signal on the light-receiving surface is calculated. This demonstrates that there occurs a considerably large off-set. Meanwhile, FIG. 18 shows a case in which the same calculation is performed using the phase-inverted diffraction grating. This demonstrates that almost all of the off-set is canceled out. Furthermore, FIG. 19 shows an embodiment in which the same calculation is applied in the differential push-pull method. This demonstrates that the off-set is made extremely small.

FIG. 20 is a diagram for showing an embodiment of an optical system constitution according to the present invention in which the reproduction is possible especially in a CD, a CD-R, a DVD-ROM, and a DVD-RAM. Two semiconductor lasers, i.e. a 650 nm semiconductor laser 2001 for the DVDs and a 780 nm semiconductor laser 2002 for the CD and the CD-R, are mounted. In view of spectroscopic characteristics of reflectance of a CD-R storage film, the 780 nm semiconductor laser 2002 is absolutely necessary for the reproduction in the CD-R. The respective lights are launched into diffraction gratings 2003, 2004, respectively, thus generating the ±1st order diffracted lights. Here, the diffraction grating 2003 for 650 nm wavelength is a diffraction grating described up to now in the present invention, and the diffraction grating 2004 for 780 nm wavelength is a diffraction grating for forming sub-spots for a 3-beam tracking method usually employed to detect a tracking in the CD. Then, the light with 650 nm wavelength is reflected at a dichromatic mirror 2005, passes through a beam splitter 2006, is reflected at a triangle reflection mirror 2007, and is converged on the DVD 2009 by a DVD/CD compatible objective lens 2008. Meanwhile, the light with 780 nm wavelength is reflected at the beam splitter 2006 and at the triangle reflection mirror 2007, and is converged on the CD or the CD-R disk 2009 by the DVD/CD compatible-objective lens 2008. Respective reflected lights, by way of the DVD/CD compatible objective lens 2008 and the triangle reflection mirror 2007, passes through the beam splitter 2006, the dichromatic mirror 2005 and an optical component G, then being converged on an optical detector 2010.

FIG. 21 is a diagram for explaining the optical component G, a light-receiving pattern constitution of the optical detector, and signal calculation methods in a plurality of embodiments obtained by changing the focal point shift detecting method in the above-mentioned optical system constitution. When a beam size detection method is employed as the focal point shift detecting method, a curvilinear diffraction grating 2101 is employed as the optical component G. The curvilinear diffraction grating 2102, for each of a 0th order light and ±1st order diffracted lights generated by the diffraction grating 2003 or 2004, outputs optical spots to be situated somewhat before a focal point on the optical detector surface and optical spots to be situated somewhat behind the focal point thereon as ±1st order diffracted lights generated by the curvilinear diffraction grating 2101. At this time, diffraction efficiency of the curvilinear diffraction grating 2101 is made large enough. This prevents the 0th order light from being generated, thus making it possible to decrease the number of the detection regions. In this way, out of the six optical spots in total, from a set of the ±1st order diffracted lights generated by the curvilinear diffraction grating 2102, a focal point shift error signal according to the beam size detection method is obtained. One of the 0th order lights generated by the diffraction gratings 2003 and 2004 is received by a four-divided optical detector, thereby being able to obtain a DPD signal (differential phase detection) employed in the DVD-ROM. Also, it is possible to obtain a push-pull signal in which the off-set is canceled out from one of the 0th order light and the ±1st order diffracted lights generated by the diffraction grating 2003. It is possible to detect the 3-beam tracking error signal for the CD from a difference in the amount of light between the ±1st order diffracted lights generated by the diffraction grating 2004. Also, it is possible to obtain a reproduced RF signal from a total amount of light of the 0th order lights generated by the diffraction gratings 2003 and 2004.

When a double knife edge method is employed as the focal point shift detecting method, a light dividing prism 2102 is employed as the optical component G. The light dividing prism 2102 divides each of the diffracted lights, which are generated by the diffraction grating 2003 or 2004, into four lights on the optical detector surface. From the four lights of one of the diffracted lights, a focal point shift error signal according to the double knife edge method is obtained. The signals, such as the tracking error signal according to the push-pull method, the DPD signal, the tracking error signal according to the 3-beam method, and the RF signal, can be obtained, as shown in FIG. 21, in almost the same way as in the beam size detection method.

In these focal point shift detecting methods, selection of the direction of the divided lines in the optical detector makes it possible to comparatively suppress, in the deviations and the aberrations, too, the occurrence of the disturbance which accompanies the crossing over the guiding groove. Accordingly, in the present embodiment, the constitution of adding the light the variations in intensity distribution of which are inverted is not presented in particular. However, depending on the constitution of the optical system, it may become necessary from the other requirements to provide a constitution of the divided lines in which the disturbance occurs easily. In that case, focus error signals of lights the variations in intensity distribution of which are inverted are added to each other, thereby allowing the disturbance to be reduced in the focus error detecting methods other than the astigmatic focal point shift detecting method, too. Consequently, the present invention also makes possible an optical system constitution which, conventionally, could not be employed from the viewpoint of the disturbance which accompanies the crossing over the guiding groove. This characteristic allows a flexibility in the design to be increased.

When the astigmatic focal point shift detecting method is employed as the focal point shift detecting method, the optical component G is unnecessary. The reason is that an astigmatism which occurs when the lights pass through the dichromatic mirror can be substituted for the astigmatism for the astigmatic focal point shift detection. This is based on a principle that, when a focused light is launched into a parallel flat plate, an astigmatism occurs. Here, in the focus error detection, as described up to now from the viewpoint of the disturbance, the focus error signals of the 0th order light and the ±1st order diffracted lights are added to each other. Conventionally, when the astigmatism is introduced using the parallel flat plate, the parallel flat plate was inserted in such a manner as to form an angle of 45 degrees toward the tracks so that the disturbance which accompanies the crossing over the guiding groove does not occur easily. This kind of restriction, however, becomes unnecessary because of the canceling of the disturbance based on the present invention. Accordingly, in some cases, the present invention can be effective in making the optical head compact in the whole size. Also, concerning the tracking error signal according to the push-pull method, the tracking error signal the distribution of which is inverted is similarly subtracted. The other transactions are performed in much the same way as in the cases in which the other focus error detecting methods are employed.

According to the present invention, by adding an inexpensive component such as a diffraction grating to a fixed optical system without mounting it on the objective lens actuator, it is possible to fundamentally eliminate the disturbance which occurs in the focus error signal in association with the decentering of an optical disk when an optical spot crosses a track on the surface of the storage film. At the same time, it is possible to fundamentally cancel the off-set which occurs in the tracking error signal in association with the movement of the lens.

What is claimed is:

1. An optical head comprising:
   a semiconductor laser which emits light;
   a light-converging optical system which converges light emitted from the semiconductor laser onto an optical disk having a periodic structure in a radial direction of the optical disk to form at least one focused spot on the optical disk, the periodic structure including information tracks;
   means for generating a plurality of reflected light beams from the at least one focused spot on the optical disk, the reflected light beams including
      at least one first reflected light beam having an intensity distribution which varies with a first polarity when the periodic structure crosses the at least one focused spot on the optical disk, and
      at least one second reflected light beam having an intensity distribution which varies with a second polarity opposite to the first polarity when the periodic structure crosses the at least one focused spot on the optical disk,
      wherein a variation in the intensity distribution of the at least one first reflected light beam when the periodic structure crosses the at least one focused spot on the optical disk is substantially inverted with respect to a variation in the intensity distribution of the at least one second reflected light beam when the periodic structure crosses the at least one focused spot on the optical disk;
   an optical detection system which detects the at least one first reflected light beam and the at least one second reflected light beam, and outputs detection signals in response to the detected at least one first reflected light beam and the detected at least one second reflected light beam; and
   an electrical circuit which generates respective focus error signals and respective tracking error signals for the at least one first reflected light beam and the at least one second reflected light beam from the detection signals output from the optical detection system,
      adds the focus error signals of the at least one first reflected light beam to the focus error signals of the at least one second reflected light beam to produce a focus error signal for the optical head so that variations in the focus error signals of the at least one first reflected light beam and the at least one second reflected light beam caused by the variations in the intensity distributions of the at least one first reflected light beam and the at least one second reflected light beam cancel each other out,
      amplifies the tracking error signals of the at least one first reflected light beam with a first gain,
      amplifies the tracking error signals of the at least one second reflected light beam with a second gain, a ratio of the second gain to the first gain being proportional to a ratio of a total amount of light in the at least one first reflected light beam to a total amount of light in the at least one second reflected light beam when one of the at least one focused spot is centered on one of the information tracks, and
      takes a difference between the amplified tracking error signals of the at least one first reflected light beam and the amplified tracking error signals of the at least one second reflected light beam to produce a tracking error signal for the optical head.

2. An optical head according to claim 1, further comprising a beam splitting device which splits the at least one first reflected light beam and the at least one second reflected light beam off from an optical path extending from the semiconductor laser to the optical disk;
   wherein the means for generating a plurality of reflected light beams includes a diffraction grating disposed between the semiconductor laser and the beam splitting device, the diffraction grating being arranged so that gratings of the diffraction grating are tilted relative to the radial direction of the optical disk so that two focused spots of ±1st order diffracted light on the optical disk produced by the diffraction grating are shifted by substantially one-half of a period of the periodic structure in opposite directions in the radial direction of the optical disk relative to a focused spot of 0th order diffracted light on the optical disk produced by the diffraction grating.

3. An optical head according to claim 1, further comprising a beam splitting device which splits the at least one first reflected light beam and the at least one second reflected light beam off from an optical path extending from the semiconductor laser to the optical disk;

wherein the light-converging optical system includes an objective lens; and wherein the means for generating a plurality of reflected light beams includes a diffraction grating disposed between the semiconductor laser and the beam splitting device, the diffraction grating being arranged so that gratings of the diffraction grating are parallel to a radial direction of the optical disk so that two focused spots of ±1st order diffracted light on the optical disk produced by the diffraction grating are at a same position in the radial direction of the optical disk as a focused spot of 0th order diffracted light on the optical disk produced by the diffraction grating, a phase of the gratings being inverted at intervals of substantially $\lambda D/(2NA \cdot P)$ in the radial direction of the optical disk, wherein $\lambda$ is a wavelength of the light emitted from the semiconductor laser, D is an effective light beam diameter on the diffraction grating, NA is a numerical aperture of the objective lens, and P is a period of the periodic structure in the radial direction of the optical disk.

4. An optical head according to claim 1, further comprising a beam splitting device which splits the at least one first reflected light beam and the at least one second reflected light beam off from an optical path extending from the semiconductor laser to the optical disk;

wherein the light-converging optical system includes an objective lens; and wherein the means for generating a plurality of reflected light beams includes a polarizing phase shifter disposed between the semiconductor laser and the beam splitting device, the polarizing phase shifter being constituted so that it inverts a phase of a first linearly polarized light component, which is polarized in a first direction, in alternate ones of regions of the polarizing phase shifter having a period of substantially $\lambda D/(2NA \cdot P)$ in the radial direction of the optical disk, wherein $\lambda$ is a wavelength of the light emitted from the semiconductor laser, D is an effective light beam diameter on the diffraction grating, NA is a numerical aperture of the objective lens, and P is a period of the periodic structure in the radial direction of the optical disk, without varying a phase of a second linearly polarized light component, which is polarized in a second direction perpendicular to the first direction, in any of the regions of the polarizing phase shifter.

5. An optical head according to claim 4, wherein the optical detection system includes an optical detector having at least two four-divided optical detection regions; and wherein each of the at least two four-divided optical detection regions receives a respective one of the plurality of reflected light beams.

6. An optical head according to claim 1, wherein the electrical circuit has a frequency transfer characteristic which substantially cuts off a frequency band of an information signal recorded on the information tracks.

* * * * *

UNITED STATES PATENT AND TRADEMARK OFFICE
CERTIFICATE OF CORRECTION

PATENT NO. : 6,400,664 B1
DATED : June 4, 2002
INVENTOR(S) : Shimano et al.

It is certified that error appears in the above-identified patent and that said Letters Patent is hereby corrected as shown below:

<u>Title page,</u>
Item [30], should read:
-- [30] Foreign Application Priority Data
     Feb. 16, 1998   (JP) ...........................10-032559 --

Signed and Sealed this

Twenty-first Day of January, 2003

JAMES E. ROGAN
*Director of the United States Patent and Trademark Office*